(12) United States Patent
Martin et al.

(10) Patent No.: US 12,245,123 B2
(45) Date of Patent: Mar. 4, 2025

(54) EMERGENCY DATA COMMUNICATIONS FOR CITIZEN ENGAGEMENT

(71) Applicant: RapidSOS, Inc., New York, NY (US)

(72) Inventors: Michael John Martin, New York, NY (US); William Robinson, Bronx, NY (US)

(73) Assignee: RapidSOS, Inc., New York, NY (US)

(*) Notice: Subject to any disclaimer, the term of this patent is extended or adjusted under 35 U.S.C. 154(b) by 266 days.

(21) Appl. No.: 17/664,394

(22) Filed: May 20, 2022

(65) Prior Publication Data

US 2022/0377522 A1  Nov. 24, 2022

Related U.S. Application Data

(60) Provisional application No. 63/191,707, filed on May 21, 2021.

(51) Int. Cl.
*H04W 4/90* (2018.01)
*H04W 4/029* (2018.01)
*H04W 4/12* (2009.01)

(52) U.S. Cl.
CPC ............ *H04W 4/90* (2018.02); *H04W 4/029* (2018.02); *H04W 4/12* (2013.01)

(58) Field of Classification Search
None
See application file for complete search history.

(56) References Cited

U.S. PATENT DOCUMENTS

| | | | | |
|---|---|---|---|---|
| 10,805,462 | B1* | 10/2020 | Ginter | H04L 67/563 |
| 10,810,864 | B1* | 10/2020 | Reufer | G08B 25/10 |
| 2015/0269700 | A1* | 9/2015 | Miasnik | G06Q 10/00 |
| | | | | 705/325 |
| 2017/0346820 | A1* | 11/2017 | Valla | H04L 51/222 |
| 2024/0071197 | A1* | 2/2024 | Bongberg | G08B 27/001 |

* cited by examiner

*Primary Examiner* — Kenneth B Wells
(74) *Attorney, Agent, or Firm* — Sterne, Kessler, Goldstein & Fox P.L.L.C.

(57) ABSTRACT

Disclosed herein are systems, devices, media, and methods for providing emergency data communications for citizen engagement. An embodiment operates by providing an emergency data submission link regarding an emergency notification to a plurality of communication devices. Emergency data submissions are received with the link, where each submission includes an emergency location. The embodiment verifies the submissions to generate a set of submitted emergency incidents, and displays the incidents within a graphical user interface (GUI) of an emergency response application. An embodiment operates by receiving emergency data related to a plurality of emergency incidents. The embodiment generates a heatmap that graphically represents a density of a plurality of emergency incidents. The embodiment identifies clusters of emergency incidents on the heatmap, and displays the heatmap within an interactive map within a GUI of an emergency response application accessed by an emergency service provider (ESP).

19 Claims, 16 Drawing Sheets

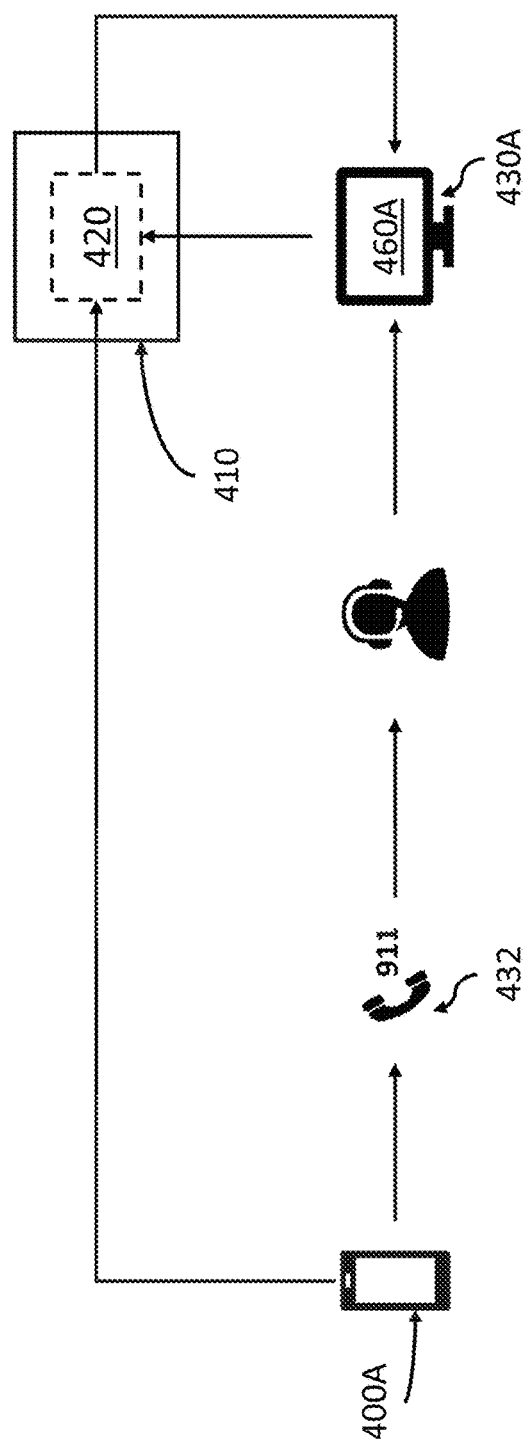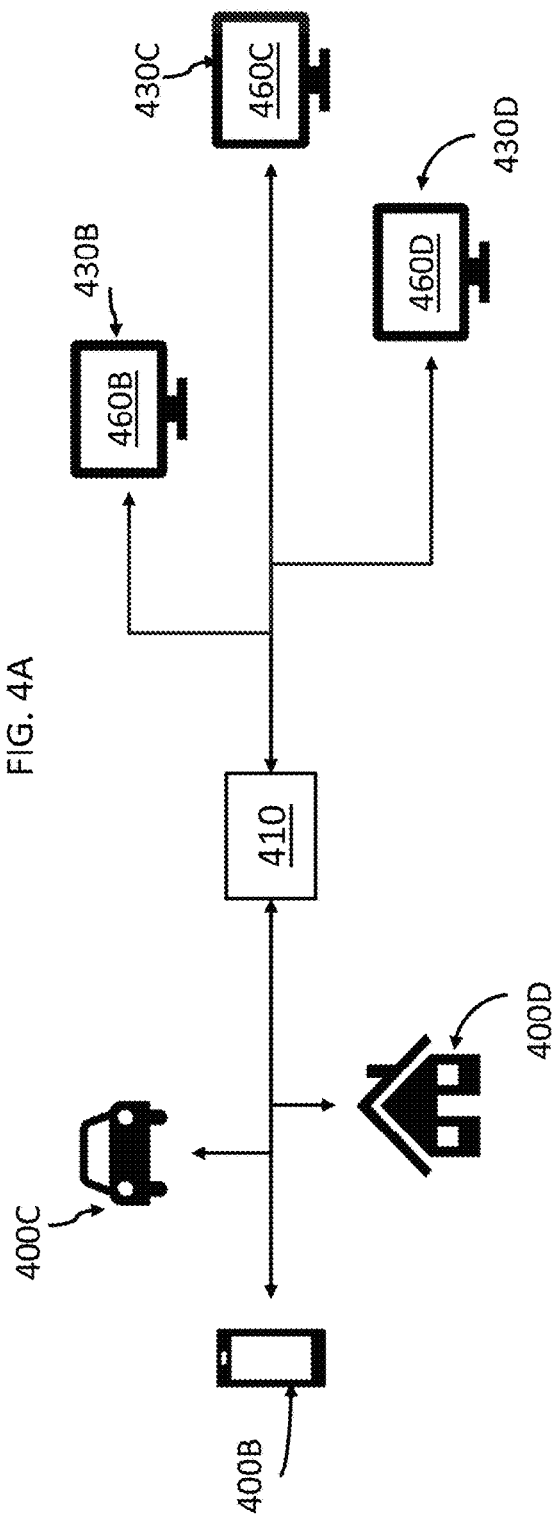

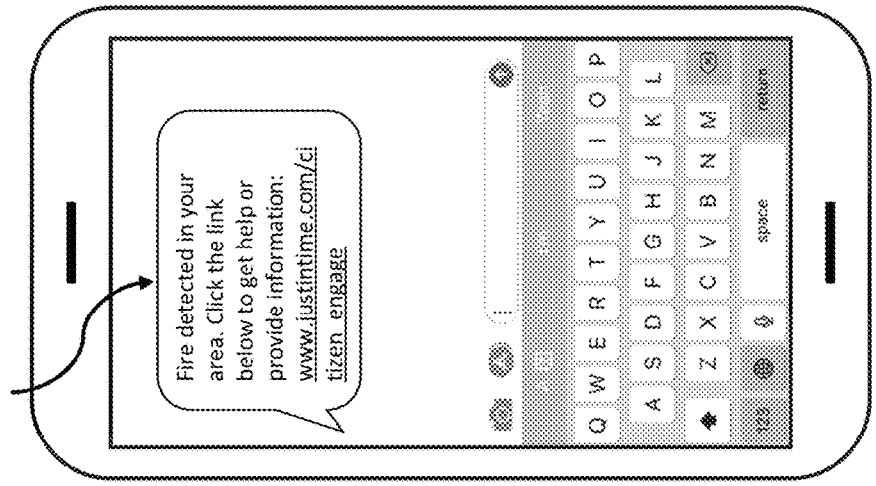
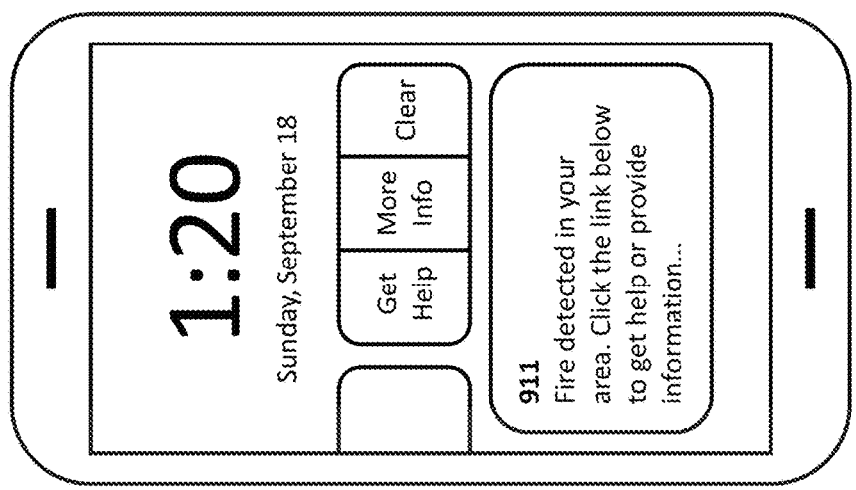
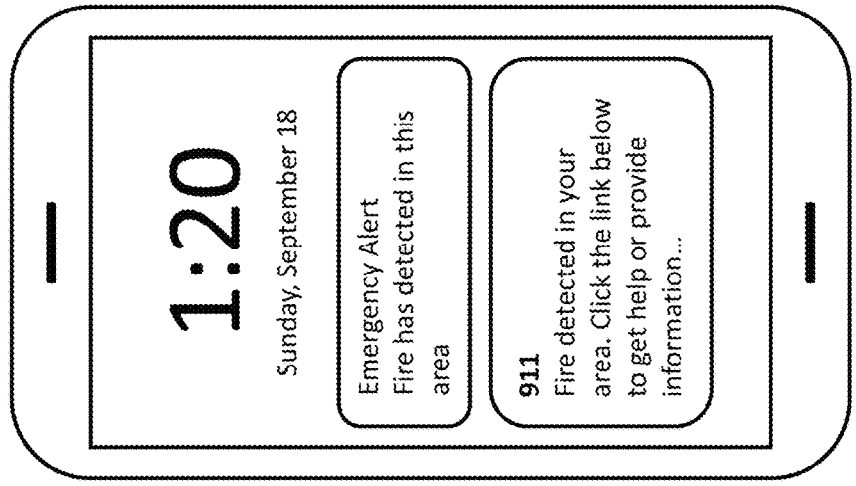
FIG. 6

EMERGENCY DATA COMMUNICATIONS FOR CITIZEN ENGAGEMENT

CROSS-REFERENCE TO RELATED APPLICATIONS

This application claims priority to U.S. Provisional Patent Application No. 63/191,707 titled "Emergency Data Communications for Citizen Engagement" filed on May 21, 2021, which is herein incorporated by reference in its entirety for all purposes.

BACKGROUND

Field

The described aspects generally relate to mechanisms for emergency data communications.

Related Art

A person in an emergency situation may request help using a mobile communication device such as a cell phone to dial a designated emergency number like 9-1-1 or a direct access phone number for the local emergency service provider (e.g. an emergency dispatch center). Traditionally, this call is assigned to one or more first responders by the emergency service provider, and the caller's estimated location (generally either the location of a nearby cell tower or a triangulation from the location of three or more nearby cell towers) is provided to the emergency service provider by the caller's wireless carrier (e.g., AT&T®, etc.). Alternatively, the caller may provide their location to the emergency service provider by verbally speaking their location over the phone. Unfortunately, many emergency callers are unaware of their precise location or otherwise unable to verbalize it.

However, modern technologies have enabled the development and implementation of previously unimaginable or unachievable emergency services. For example, modern communication devices are capable of generating highly accurate, real-time locations (e.g., device-based hybrid locations) during emergency situations (e.g., in response to an emergency number being dialed) and transmitting the locations to emergency management systems and emergency service providers. Emergency service providers can then use these accurate locations to more quickly locate and dispatch emergency assistance to emergency callers. In another example, devices such as surveillance cameras can capture images, videos, or audio that can be shared in real-time with emergency management systems and emergency service providers to provide emergency service providers with situational awareness that they did not have access to in the past.

In current systems, calls to an emergency number like 9-1-1 are usually initiated by a person in an emergency or by callers that are in an area in the proximity of the emergency. An emergency provider may not have the ability to proactively reach out to the people in a disaster zone or an emergency condition and illicit information regarding the emergency. An ability to proactively obtain timely and accurate information regarding the nature and extent of an emergency condition would enable emergency service providers to quickly and optimally dispatch emergency assistance.

SUMMARY

Disclosed herein are systems, devices, computer-readable media, and methods for sharing emergency data communications between citizens and emergency personnel. For example, some embodiments of this disclosure are directed to a computer implemented method for sharing emergency data communications. The computer implemented method includes providing an emergency data submission link regarding an emergency notification to several communication devices. A plurality of emergency data submissions related to the emergency notification are received via the emergency data submission link from the plurality of communication devices, and each emergency data submission includes an emergency location. The computer implemented method further includes verifying the plurality of emergency data submissions to generate a set of submitted emergency incidents, and displaying the submitted emergency incidents within a graphical user interface (GUI) of an emergency response application accessed by an emergency service provider (ESP).

In some embodiments, the computer implemented method further includes, determining an affected area for the emergency notification based on the submitted emergency incidents, and displaying the affected area within the GUI of the emergency response application accessed by the ESP.

In some embodiments, the computer implemented method further includes generating a heatmap of submitted emergency incidents using the plurality of emergency locations, and the heatmap graphically indicates a density of emergency data submissions within the affected area determined for the emergency notification, and displaying the heatmap of submitted emergency incidents within the GUI of the emergency response application accessed by the ESP.

In some embodiments, the computer implemented method further includes obtaining an alert corresponding to an emergency from one or more sources, identifying device identifiers corresponding to each of the plurality of communication devices that are located within an estimated geographic area associated with the emergency, and providing the emergency data submission link to the plurality of communication devices using the device identifiers. In some embodiments, the one or more sources include at least one of a wireless communications device, a telephone landline, a public service answering point (PSAP) of the ESP, a telephone service provider, a telephone device manufacturer, a social media post, and a public safety agency.

In some embodiments, verifying the plurality of emergency data submissions further includes receiving, from each communication device of the plurality of communication devices, a confirmation of an emergency data submission. In some embodiments, verifying the plurality of emergency data submissions further includes verifying that the location corresponding to an emergency data submission of the plurality of emergency data submissions is within an estimated geographic area that is associated with an emergency and/or verifying that a communication device of the plurality of communication devices is not in a list of blocked devices. In some embodiments, the emergency data submission link is sent to a communication device of the plurality of communication devices via one or more of short message service (SMS) text, SMS data, a multimedia messaging service (MMS), Internet protocol (IP) messaging, email, or an integrated public alert and warning system (IPAWS).

In some embodiments, the emergency data submission link provides a user of a communication device of the plurality of communication devices with an option to complete a survey form, upload an image, audio, or video file, grant permission to an Internet of things (IoT) sensor feed, or share a location, text chat, or video stream via a web real-time communication (WebRTC) link. In some embodiments, a device identifier corresponding to a communication device of the plurality of communication devices is obtained from one or more of a public service answering point (PSAP) of the ESP, a telephone service provider, a telephone device manufacturer, and a public safety agency. In some embodiments, the emergency data communications between a user of a communication device of the plurality of communication devices and an authorized user at the ESP are bidirectional. In some embodiments, the data submission link is a hyperlink, a web real-time communication (WebRTC) link, a phone number, a web service endpoint, or an Internet protocol (IP) address.

Some embodiments of this disclosure are directed to a system for emergency communications. The system includes a memory and at least one processor coupled to the memory. The at least one processor is configured to receive emergency data related to a plurality of emergency incidents from one or more sources, where the emergency data includes emergency locations. A heatmap of emergency incidents is generated using the plurality of emergency locations, where the heatmap graphically represents a density of the plurality of emergency incidents. The at least one processor is further configured to identify one or more clusters of emergency incidents on the heatmap, and display the heatmap within an interactive map within a graphical user interface (GUI) of an emergency response application accessed by an emergency service provider (ESP).

In some embodiments, the one or more clusters of emergency incidents is identified based on one or more of an emergency type, an emergency priority, a type of notification, and an emergency incident density. In some embodiments, the one or more sources comprises at least one of a sensor device, a wireless communications device, a telephone landline, a public service answering point (PSAP) of the ESP, a telephone service provider, a telephone device manufacturer, a social media post, and a public safety agency. In some embodiments, the at least one processor is further configured to generate, based on the heatmap, an estimate of a number of emergency response assets that are to be dispatched to the plurality of emergency locations.

In some embodiments, the at least one processor is further configured to provide an emergency data submission link to a plurality of communication devices that are located within an estimated geographic area associated corresponding to the heatmap, receive, via the emergency data submission link, a plurality of emergency data submissions related to the plurality of emergency incidents, and generate an updated heatmap using the plurality of emergency data submissions. In some embodiments, the emergency data further comprises at least one of an emergency type and an emergency priority indicator. In some embodiments, the at least one processor is further configured to receive a selection of a cluster of emergency incidents within the heatmap within the interactive map, and in response to receiving the selection of the cluster of emergency incidents, display, within the interactive map, only emergency locations associated with emergency incidents within the heatmap. In some embodiments, the at least one processor is further configured to receive a selection of an emergency incident from within a cluster of emergency incidents within the interactive map, receive a request to remove the emergency incident from the cluster of emergency incidents through the GUI of the emergency response application, and remove the emergency incident from the cluster of emergency incidents.

Some embodiments of this disclosure are directed to a non-transitory computer-readable medium having instructions stored thereon that, when executed by at least one computing device, cause the at least one computing device to perform operations. The operations include providing an emergency data submission link regarding an emergency notification to a plurality of communication devices, receiving, via the emergency data submission link, a plurality of emergency data submissions related to the emergency notification from the plurality of communication devices, where each emergency data submission comprises an emergency location. The operations further include verifying the plurality of emergency data submissions to generate a set of submitted emergency incidents, and displaying the submitted emergency incidents within a graphical user interface (GUI) of an emergency response application accessed by an emergency service provider (ESP).

BRIEF DESCRIPTION OF THE DRAWINGS

The accompanying drawings are incorporated herein and form a part of the specification.

FIGS. 4A and 4B illustrate systems and processes for receiving and transmitting emergency data by an emergency response data platform, according to some embodiments.

FIG. 6 illustrates a push notification and a text message containing a link to web application, according to some embodiments of this disclosure.

In the drawings, like reference numbers generally indicate identical or similar elements. Additionally, generally, the left-most digit(s) of a reference number identifies the drawing in which the reference number first appears.

DETAILED DESCRIPTION

Figure 1:
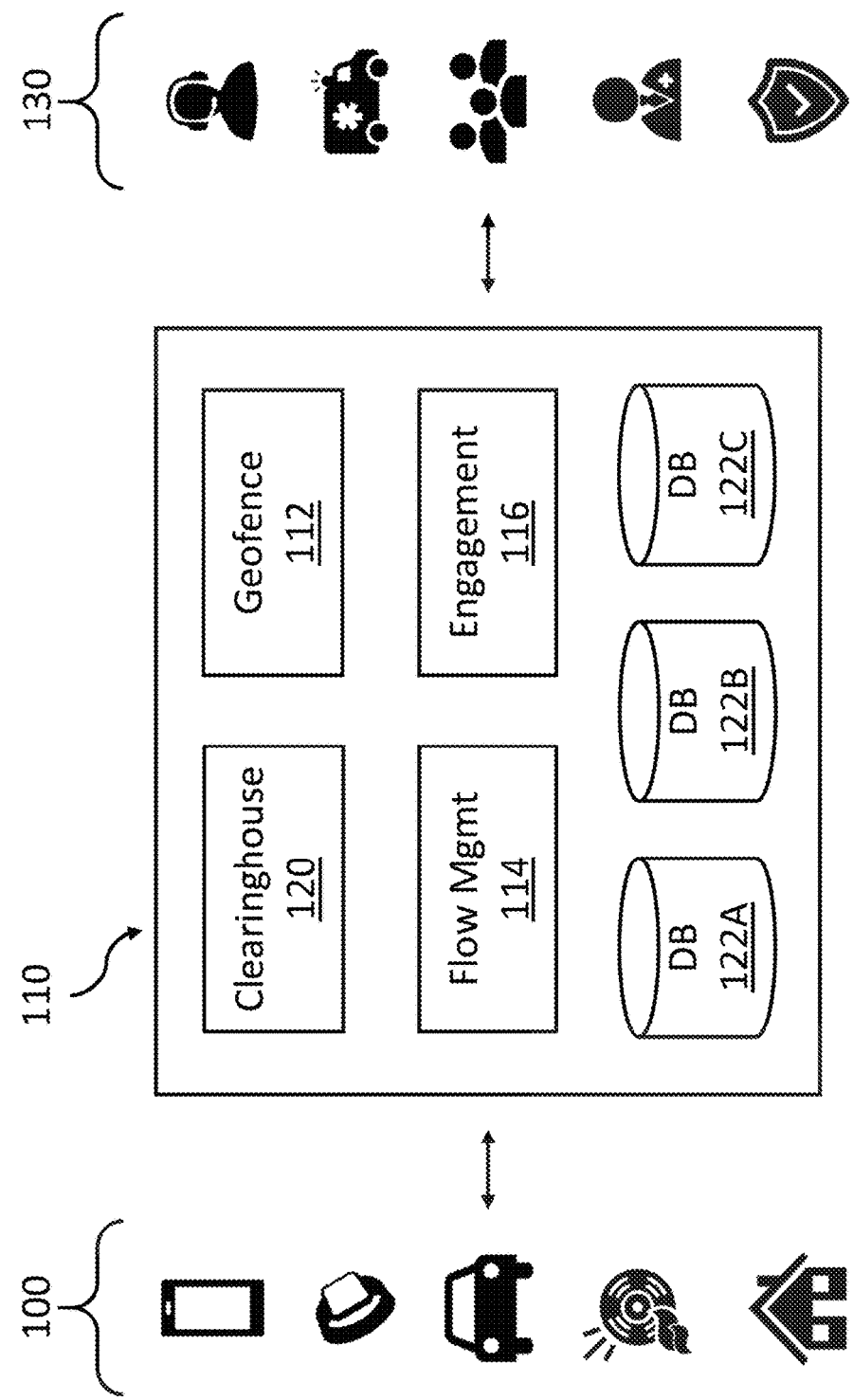
FIG. 1 is a block diagram of an emergency response data platform (ERDP), according to some embodiments of the present disclosure.

In some embodiments, the systems, servers, devices, methods, and computer-readable media of the instant application provide the ability to gather and deliver device-based hybrid locations (hereinafter, "enhanced locations") and additional data that may be pertinent to emergency situations to emergency service providers (ESPs; e.g., public safety answering points, fire departments, police departments, paramedics, police officers, etc.). In some embodiments, an emergency management system (ERDP) includes a clearinghouse (also referred to as an "Emergency Clearinghouse") that functions to receive enhanced locations (e.g., device-based hybrid location, verified location) and additional data (e.g., medical history, video feeds, sensor data) from various sources (e.g., medical databases, mobile devices of public or first responders, public cameras, police system, media outlets) and at various times before, during, or after emergency situations and distribute enhanced locations and additional data to ESPs to aid emergency responders in responding to live emergency situations. In some embodiments, the enhanced locations and additional data are delivered by the ERDP to a public safety answering point (PSAP). In some embodiments, the enhanced locations and additional data are displayed within a preexisting pathway, such as an Automatic Location Identification (ALI) display. In some embodiments, the enhanced locations and additional data are obtained through alternative pathways directly from the devices in the emergency. In some embodiments, relevant emergency data from different sources are consolidated and displayed for rapid and efficient response. In some embodiments, the enhanced locations and additional data are displayed through a graphical user interface provided by an emergency response application separate from the preexisting ESP system (e.g., PSAP system).

Disclosed herein are systems, devices, media, and methods for providing enhanced emergency communications and functions. Embodiments of the present disclosure take advantage of technological advancements that have allowed for mobile communication devices to generate accurate locations by incorporating multiple technologies embedded in the devices, such as GPS, Wi-Fi, and Bluetooth to create device-based hybrid locations. Device-based hybrid locations are locations calculated on an electronic or communication device, as opposed to locations calculated using a network (e.g., a carrier network). Device-based hybrid locations can be generated using GPS, network-based technologies, Wi-Fi access points, Bluetooth beacons, barometric pressure sensors, dead reckoning using accelerometers and gyrometers, and a variety of crowdsourced and proprietary databases that device operating system providers are running to enhance location technology. These device-based hybrid locations can be quickly generated during emergency calls.

Furthermore, electronic communication devices include various devices with communication capability to communicate with other devices via Wi-Fi, Bluetooth, etc. Many of these devices are Internet-abled and can communicate via the Internet by sending messages such as chat, email, HTTP post, etc. Some electronic communication devices have phone numbers and are enabled for cellular communication or VoIP, such as a SIM-enabled wearable device. Other devices may not have a phone number and be unable to make wireless calls or send SMS. In some cases, devices that do not have a phone number may be associated with the owner's account phone number or be assigned a number for the duration of the emergency session. Communication devices may include various devices such as computers, mobile phones, wearables, digital assistants, smart TVs, security system, vehicular telematics system, IoT sensors, etc. In some embodiments, mobile communication devices (e.g., mobile phones, wearables, IoT devices, smart home devices, vehicle computers, etc.) are often capable of generating or storing additional information that provides situational awareness about the emergency, such as health sensor data or medical histories. For example, during an emergency, a modern mobile communication device may have access to an implicated person's blood type, preexisting medical conditions, or even the implicated person's current heartrate. In another example, a sensor in the home can detect glass breakage indicating a possible burglary. In some embodiments, the mobile communication device has access to data from sensors (e.g., health or environmental sensors). For example, a video feed of the emergency via a connected surveillance camera can provide valuable situational awareness regarding the emergency.

Emergency Response Data Platform

In various embodiments, disclosed herein are devices, system, and methods for managing emergency data and emergency communications for more effective and efficient emergency response. FIG. 1 depicts a diagram of an emergency response data platform in accordance with one embodiment of the present disclosure. In a simple example, in some embodiments, an emergency data source 100 transmits emergency to an emergency response data platform (ERDP) 110 before, during, or after an emergency, and the emergency response data platform 110 shares the emergency data with an emergency service provider (ESP) 130. Exemplary ingress data sources 100 includes mobile phones, wearables, vehicle telematics system, smart security system, and mobile applications. The ESP 130 can then use the emergency data to more efficiently and effectively respond to corresponding emergencies. In some embodiments, the emergency data source 100 is a third-party server system (hereinafter, "third-party server"). For example, in some embodiments, the emergency data source 100 is a third-party server (e.g., a backend server system) of a technology company that produces software for electronic devices, such as Apple or Google. In some embodiments, the emergency data source 100 is an electronic device, such as an electronic communication device. For example, the emergency data source 100 may be a communication device (e.g., a walkie talkie or two-way radio, a mobile or cellular phone, a computer, a laptop, etc.), a wearable device (e.g., a smartwatch), or an Internet of Things (IoT) device such as a home assistant (e.g., an Amazon Echo) or a connected smoke detector (e.g., a Nest Protect smoke and carbon monoxide alarm). In some embodiments, an electronic device includes a display, a processor, a memory (e.g., an EPROM memory, a RAM, or a solid-state memory), a network component (e.g., an antenna and associated components, Wi-Fi adapters, Bluetooth adapters, etc.), a data storage, a user interface, an emergency alert program, one or more location components, and one or more sensors. In some embodiments, the processor is implemented as one or more microprocessors, microcomputers, microcontrollers, digital signal processors, central processing units, state machines, logic circuitries, and/or devices that manipulate signals based on operational instructions. Among other capabilities, the processor is configured to fetch and execute computer-readable instructions stored in the memory.

In some embodiments, the display is part of the user interface (e.g., a touchscreen is both a display and a user interface in that it provides an interface to receive user input or user interactions). In some embodiments, the user interface includes physical buttons such as an on/off button or volume buttons. In some embodiments, the display and/or the user interface comprises a touchscreen (e.g., a capacitive touchscreen), which is capable of displaying information and receiving user input. In some embodiments, the communication device includes various accessories that allow for additional functionality. In some embodiments, these accessories (not shown) include one or more of the following: a microphone, a camera, speaker, a fingerprint scanner, health or environmental sensors, a USB or micro-USB port, a headphone jack, a card reader, a SIM card slot, or any combination thereof. In some embodiments, the one or more sensors include, but are not limited to: a gyroscope, an accelerometer, a thermometer, a heart rate sensor, a barometer, or a hematology analyzer. In some embodiments, the data storage includes a location data cache and a user data cache. In some embodiments, the location data cache is configured to store locations generated by the one or more location components.

In some embodiments, an emergency data source 100 includes an emergency alert program. In some embodiments, the emergency alert program is a web application or mobile application. In some embodiments, the emergency alert program is configured to record user data, such as a name, address, or medical data of a user associated with the electronic device. In some embodiments, the emergency alert program is configured to detect when an emergency request is generated or sent by the electronic device (e.g., when a user uses the electronic device to make an emergency call). In some embodiments, in response to detecting an emergency request generated or sent by the electronic device, the emergency alert program is configured to deliver a notification to the ERDP 110. In some embodiments, the notification is an HTTP post containing information regarding the emergency request. In some embodiments, the notification includes a location (e.g., a device-based hybrid location) generated by or for the electronic device. In some embodiments, in response to detecting an emergency request generated or sent by the electronic device, the emergency alert program is configured to deliver user data to the ERDP 110.

In some embodiments, the emergency response data platform (ERDP) 110 includes an ERDP operating system, an ERDP CPU, an ERDP memory unit, an ERDP communication element, and one or more software modules. In some embodiments, the ERDP CPU is implemented as one or more microprocessors, microcomputers, microcontrollers, digital signal processors, central processing units, state machines, logic circuitries, and/or devices that manipulate signals based on operational instructions. Among other capabilities, the ERDP CPU is configured to fetch and execute computer-readable instructions stored in the ERDP memory unit. The ERDP memory unit optionally includes any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The ERDP memory unit optionally includes modules, routines, programs, objects, components, data structures, etc., which perform particular tasks or implement particular abstract data types.

In some embodiments, the ERDP 110 includes one or more ERDP databases 122, one or more servers, and a clearinghouse 120. In some embodiments, the clearinghouse 120, as described in further detail below, is an input/output (I/O) interface configured to manage communications and data transfers to and from the ERDP 110 and external system and devices. In some embodiments, the clearinghouse 120 includes a variety of software and hardware interfaces, for example, a web interface, a graphical user interface (GUI), and the like. The clearinghouse 120 optionally enables the ERDP 110 to communicate with other computing devices, such as web servers and external data servers. In some embodiments, the clearinghouse 120 facilitates multiple communications within a wide variety of networks and protocol types, including wired networks, for example, LAN, cable, etc., and wireless networks, such as WLAN, cellular, or satellite. In some embodiments, the clearinghouse 120 includes one or more ports for connecting a number of devices to one another or to another server. In some embodiments, the clearinghouse 120 includes one or more sub-clearinghouses, such as location clearinghouse and additional data clearinghouse, configured to manage the transfer of locations and additional data, respectively. In some embodiments, the ERDP 110 additionally includes a user information module that receives and stores user information (e.g., personal information, demographic information, medical information, location information, etc.) within the ERDP 110. In some embodiments, users can submit user information through a website, web application, or mobile application, such as during a registration process for an emergency response application. In some embodiments, when the ERDP 110 receives emergency data including user information, such as through an emergency alert received by the clearinghouse 120 (as described below), the ERDP 110 stores the user information in the user information module. In some embodiments, user information stored within the user information module is received by the ERDP 110 from a third-party server system, as described above. In some embodiments, user information stored within the user information module is associated with an identifier of a user or an electronic device associated with a user, such as a phone number or an email address.

In some embodiments, the location data is generated by the electronic device before the emergency call and can be made accessible by the ERDP to an ESP during an emergency. For example, a taxi company may have software that transmits the location of its cars or assets to the emergency clearinghouse preemptively. Thus, when an emergency call is made, the location of the affected taxi can be made accessible quicker to send help. In addition, the ERDP may transmit emergency alerts even when the emergency call does not go through or gets disconnected based on the emergency data from the electronic device.

Using the ERDP 110 two-sided platform, relevant emergency data about one or more emergencies can be shared with one or more egress recipients, such as a call center (e.g., PSAP), emergency responders, or emergency contacts in a secure and efficient manner. Using the platform, authorized recipients are given access to relevant information for quick and efficient emergency response. For example, a PSAP is enabled to verify the location of an emergency caller via technology, rather than relying on a distressed caller to generate the location data. Thus, a PSAP can initiate a response before the user provides any location information, saving seconds or minutes on emergency response time.

In some cases, a primary agency (e.g., PSAP-1) may select an appropriate secondary agency to respond to the emergency. In some embodiments, a federal agency such as the Center for Disease Control (CDC) is planning and overseeing various state and local ESP agencies for dealing with outbreak of infectious diseases.

In some implementations, the emergency service request, such as an emergency call, may be retained by the primary agency while the secondary agency dispatches emergency responders to the emergency location. In other implementations, the emergency service request, such as an emergency call is transferred to the appropriate secondary agency based on emergency location, type and priority of the emergency.

A primary agency may be responsible for handling emergency service requests (such as traditional emergency calls and digital requests) within an authoritative jurisdiction, which may be defined by one or more geofences. A buffer region may be defined around the boundary of the geofence and the locations falling within the buffer region can be treated as locations falling within the geofence. The buffer region may be 1 meter to 10 km, or between 200 meters to 5 km, preferably 2 km. A secondary agency may also have a geofence, which defines the area of operation, but the service request regarding an emergency has to be initiated by a primary agency.

In addition, other types of ESP agencies are also contemplated. For example, ESPs may be temporarily set up to address a particular threat or a natural disaster, such as a hurricane. The constituting ESP agencies for such a "temporary ESP agency" may be the area that might be impacted by the threat or natural disaster. It is also contemplated that ESP agencies may be both public and private entities such as corporate security, university police, call center, etc.

As mentioned above, in some embodiments, the emergency response data platform (ERDP) 110 shares emergency data with an emergency service provider (ESP) 130. In some embodiments, an ESP 130 (e.g., a public safety answering point (PSAP)) is a system that includes one or more of a display, a user interface, at least one central processing unit or processor, a network component, an audio system, (e.g., microphone, speaker and/or a call-taking headset), and an ESP application (e.g., a computer program) such as a computer aided dispatch (CAD) program or an emergency call taking program (also referred to as customer premise equipment or CPE). In some embodiments, the ESP application comprises a database of emergency responders, such as medical assets, police assets, fire response assets, rescue assets, safety assets, etc. In some embodiments, the ESP application is an emergency response application provided by the ERDP 110, as described below. In some embodiments, the ESP application is installed on a computing device at the ESP 130 and comprises one or more software modules, such as a call taking module, an ESP display module, a supplemental or updated information module, or a combination thereof. In some embodiments, the ESP application displays the information on a map (e.g., on the display). In some embodiments, the ESP application is accessible or executable on mobile devices associated with ESP 130, such as first responder devices. In some embodiments, the ESP application is an emergency response application provided by the ERDP 110, as described below.

Emergency Clearinghouse

In some embodiments, as mentioned above with respect to FIG. 1, the emergency response data platform (ERDP) 110 includes a clearinghouse 120 (also referred to as an "Emergency Clearinghouse") for receiving, storing, retrieving, and transmitting emergency data. In some embodiments, as depicted by FIG. 1, through the clearinghouse 120, the ERDP 110 can receive emergency data from an emergency data source 100 (as described above) and transmit the emergency data to an emergency data recipient, such as an emergency service provider (ESP) 130 (as described above). In this way, the ERDP 110 acts as a data pipeline between emergency data sources 100 and ESPs 130. The emergency data that passes through the clearinghouse 120 may include (but is not limited to) location data (e.g., fixed addresses or device-based hybrid locations generated in real time) and additional data (e.g., medical history, personal information, or contact information, etc.). In some embodiments, through the clearinghouse 120, the ERDP 110 transmits emergency data to ESPs 130 to aid the ESPs 130 in responding to emergencies. For example, location data may allow emergency responders to arrive at the scene of an emergency faster, and additional data may allow emergency responders to be better prepared for the emergencies that they face.

The clearinghouse 120 may receive emergency data in various ways. For example, in some embodiments, an emergency data source 100 can unilaterally transmit emergency data to the clearinghouse 120. For example, in one embodiment, an emergency alert is triggered by an electronic device manually (e.g., in response to the selection of a soft or hard emergency button) or automatically based on sensor data received by the electronic device (e.g., smoke alarms). The electronic device can then transmit the emergency alert and any associated data to the ERDP 110, such as to an endpoint provided by the clearinghouse 120. Or, for example, in one embodiment, after an emergency alert is received by the ERDP 110 from a first emergency data source, the ERDP 110 can query a second emergency data source for emergency data (e.g., emergency data associated with the emergency alert received from the first emergency data source). For example, the emergency alert received from the first emergency data source may include a user identifier (e.g., a telephone number or an email address) for an owner or user of the first emergency data source. The ERDP 110 can then query the second emergency data source with the user identifier to retrieve additional emergency data associated with the owner or user of the first emergency data source. In some embodiments, emergency data received by the ERDP 110 is received in a format that is compatible with industry standards for storing and sharing emergency data. In some embodiments, the ERDP 110 formats emergency data that it receives into a format that is compatible with industry standards. For example, in some embodiments, the emergency data is formatted to be compatible with National Emergency Number Association (NENA) standards. In some embodiments, emergency data is formatted by the ERDP 110 to be compliant with the Presence Information Data Format Location Object (PIDF-LO) standard. In some embodiments, emergency data received by the ERDP 110 is stored within one or more databases 122. In some embodiments, emergency data received by the ERDP 110 is associated with one or more identifiers, such as a device or user identifier.

The clearinghouse 120 may share emergency data in various ways. For example, in some embodiments, an emergency data recipient, such as an ESP 130, can query the ERDP 110 for emergency data. For example, in some embodiments, an ESP 130 can query the ERDP 110 with a user identifier (e.g., a telephone number or an email address) to receive emergency data gathered or received by the ERDP 110 associated with the user identifier. Or for example, in some embodiments, an ESP 130 can query the ERDP 110 with a geospatial area to receive emergency data gathered or received by the ERDP 110 associated with the geospatial area. Alternatively, in some embodiments, the ERDP 110 can autonomously transmit emergency data to an emergency data recipient without first receiving a query from the emergency data recipient (also referred to as "pushing" emergency data, as opposed to emergency data being "pulled" with a query). In some embodiments, the ERDP 110 pushes emergency data to an emergency data recipient using an emergency data subscription system. Using the emergency data subscription system, an emergency data recipient can subscribe to the clearinghouse 120 for a particular device identifier, user identifier, ESP account, or geospatial area. After subscribing to a subscription, the emergency data recipient may automatically receive updates regarding the subscription without first sending a query for emergency data. For example, if an ESP 130 subscribes to a phone number, whenever the ERDP 110 receives updated emergency data associated with the phone number, the clearinghouse 120 can instantly and automatically transmit the updated emergency data associated with the phone number to the ESP 130.

As used herein, "emergency data" refers to data pertaining to an on-going or historical emergency. The emergency data may be generated at the time of the emergency. The emergency data may be generated before the emergency occurs and may be made accessible when the emergency occurs. In some embodiments, the emergency data comprises location data, particularly the current location of the emergency (often times based on the location of the user device). Because of privacy and security concerns, emergency data must be stored, accessed, and transmitted using security and privacy measures.

As used herein, "sensor data" refers to information obtained or provided by one or more sensors. In some instances, a sensor is associated with a device (e.g., user has a communication device with a data link via Bluetooth with a wearable sensor, such as, for example, a heart rate monitor or a pedometer). Accordingly, in some embodiments, the device obtains sensor data from the sensor (e.g., heart rate from the heart rate monitor or distance traveled from the pedometer). In some instances, the sensor data is relevant to an emergency situation (e.g., heart rate during a cardiac emergency event). In some embodiments, a sensor and/or sensor device comprises an acoustic sensor, a breathalyzer, a carbon dioxide sensor, a carbon monoxide sensor, an infrared sensor, an oxygen sensor, an ozone monitor, a pH sensor, a smoke detector, a current sensor (e.g., detects electric current in a wire), a magnetometer, a metal detector, a radio direction finder, a voltage detector, an air flow meter, an anemometer, a flow sensor, a gas meter, a water meter, a Geiger counter, an altimeter, an air speed indicator, a depth gauge, a gyroscope, a compass, an odometer, a shock detector (e.g., on a football helmet to measure impact), a barometer, a pressure gauge, a thermometer, a proximity sensor, a motion detector (e.g., in a home security system), an occupancy sensor, or any combination thereof, and in some embodiments, sensor data comprises information obtained from any of the preceding sensors. In some embodiments, one or more sensors are physically separate from a user device. In further embodiments, the one or more sensors authorize the user device to obtain sensor data. In further embodiments, the one or more sensors provide or send sensor data to the user device autonomously. In some embodiments, the user device and the one or more sensors belong to the same group of devices, wherein member devices are authorized to share data. In some embodiments, a user device comprises one or more sensors (e.g., user device is a wearable device having a sensor or sensing component).

Emergency Data Geofencing

In some embodiments, a geofence system 112 is applied to the clearinghouse 120 or the ERDP 110 to ensure that emergency data reaches authorized recipients and to protect sensitive emergency data from being shared with unintended recipients. As depicted in FIG. 1, in some embodiments, when emergency data (e.g., an emergency location or additional data) is received by the ERDP 110 from an emergency data source 100, the emergency data is first processed by the geofence system 112 before being ingested by the clearinghouse 120. Similarly, in some embodiments, when a data request for emergency data is received by the ERDP 110 from an emergency data recipient (e.g., an ESP 130), the query is processed by the geofence system 112 before emergency data is transmitted to the emergency data recipient.

Generally, a geofence is a virtual perimeter that represents a real-world geographic area. A geofence can be dynamically generated—as in a radius around a point location—or a geofence can be a predefined set of boundaries (such as school zones or neighborhood boundaries). For emergency response, an emergency service provider (public or private entities) may be given jurisdictional authority to a certain geographical region or jurisdiction (also referred to as "authoritative regions"). In the context of emergency services, one or more geofences may correspond to the authoritative region of an ESP. In many cases, the ESP is a public entity such as a public safety answering point (PSAP) or a public safety service (PSS; e.g., a police department, a fire department, a federal disaster management agency, national highway police, etc.), which have jurisdiction over a designated area (sometimes, overlapping areas). Geofences are used to define the jurisdictional authority by various methods and in various Geographic Information System (GIS) formats. In some embodiments, geofences only represent authoritative regions if the geofence has been assigned or verified by a local, state, or federal government. In some embodiments, geofences represent assigned jurisdictions that are not necessarily authoritative regions. For example, in some embodiments, a geofence is unilaterally created by its associated ESP without verification or assignment by a local, state, or federal government.

In some embodiments, the ERDP 110 maintains a geofence database including one or more geofences associated with each ESP 130 that is or has ever been communicatively coupled to the ERDP 110. In some embodiments, a geofence associated with an ESP 130 may be submitted to the ERDP 110 by an administrator of the ESP 130, such as through an emergency response application (as described below) or via email. In some embodiments, when emergency data is received by the ERDP 110 the ERDP 110 identifies a location associated with the emergency data (e.g., an emergency location included in an emergency alert) and determines if the location is within the combined authoritative jurisdiction (i.e., within any one of the geofences stored in the geofence database). In some embodiments, if the location is not within the combined authoritative jurisdiction, the ERDP 110 rejects or drops the emergency data (also referred to as "ingress filtering"). In some embodiments, when the ERDP 110 receives a query for emergency data from an ESP 130, the ERDP 110 identifies a geofence associated with the ESP 130 and returns only emergency data associated with locations that are within the geofence associated with the ESP 130 (also referred to as "egress filtering). In some embodiments, geofences are used in routing emergency data that is pushed to an emergency data recipient. In some embodiments, for example, as mentioned above, an emergency data recipient may subscribe to an ESP jurisdiction, or specifically to a geofence associated with the ESP (often times the authoritative jurisdiction of the ESP). Then, when the ERDP 110 receives emergency data associated with a location that is within the geofence to which the emergency data recipient has subscribed, the ERDP 110 can instantly and automatically push the emergency data to the emergency data recipient.

Citizen Engagement System

In some embodiments, as depicted in FIG. 1, the emergency response data platform (ERDP) 110 includes a citizen engagement system 116, as described in further detail below. Generally, the citizen engagement system 116 functions to elicit emergency information from persons potentially affected by an emergency and transmit the emergency information to one or more recipients, such as an emergency service provider (ESP) 130.

Emergency Flow Management System

In some embodiments, as depicted in FIG. 1, the emergency response data platform (ERDP) includes an emergency flow management system (EFMS) 114. Generally, the EFMS functions to provide digital connectivity to emergency services to devices and applications otherwise unable to access them. Using the EFMS, an administrator of a device or application can access an emergency flow editor (also referred to as an "emergency console"), select a default emergency flow or define their own custom emergency flow, and receive an emergency flow trigger script including an emergency flow identifier (also referred to as an "emergency flow ID") unique to their chosen emergency flow. The emergency flow trigger script can then be quickly and easily integrated into the administrator's device or application. When the emergency flow trigger script is executed by the administrator's device or application, an electronic notification including the emergency flow ID is transmitted to an endpoint provided by the EFMS, which prompts the EFMS to execute the associated emergency flow chosen by the administrator.

An emergency flow may prompt the EFMS to perform a variety of functions, including (but not limited to) transmitting a notification to an emergency contact, transmitting a request for emergency service to an emergency service provider (ESP), establishing an emergency communication bridge to facilitate a Voice over Internet Protocol (VoIP) call between two or more participants, transmitting emergency data to one or more emergency data recipients, or any combination thereof, depending on the administrator's intended use case. In some embodiments, the emergency console provides a set of default emergency flows to choose from. In some embodiments, the emergency console provides a graphical user interface (GUI) that a user (e.g., an administrator of a device or application) can user to create a custom emergency flow. In some embodiments, the GUI of the emergency console allows a user to create a custom emergency flow by dragging and dropping (or otherwise manipulating) graphical representations of emergency flow building blocks into various arrangements, which prompts the EFMS to automatically generate an emergency flow according to the arrangement of the emergency flow building blocks. In some embodiments, an emergency flow building block is defined by a short script (e.g., a compilation or block of written programming commands), written in a programming language, that contains instructions for executing one or more functions. In some embodiments, when a user arranges one or more emergency flow building blocks within the GUI of the emergency console, the EFMS generates an emergency flow according to the arrangement of the one or more emergency flow building blocks by compiling the short scripts defining each of the one or more emergency flow building blocks into a single emergency flow script. In some embodiments, the emergency console allows a user to edit or create an emergency flow script directly (e.g., without the use of graphical representations of emergency flow building blocks, such as by inputting written program commands directly into a programming language input field).

ESP Authentication, Credentials & Roles

To ensure the security, privacy and integrity of the data provided to the ESP, proper authentication may be required at various steps. The authorization process may require the ESP member or user of the emergency response application to verify their identity through the use of credentials such as log-in password, config file (e.g., a configuration created in a third-party system), etc. In some embodiments, the ESP member provides fingerprint, voice command, etc., to log-in, which can be verified.

Various types of credentials may be utilized as a part of the authentication process. Credentials may be generated, stored, verified and validated by the ERDP. For example, the credentials may be generated, but must be verified (e.g. phone verification) before use. In some embodiments, the credentials are valid for a specific duration of time (e.g. 1 minute, 5 minutes, 1 hour, and 24 hours). Some non-limiting examples of credentials that can be used are access keys, admin credentials, time-limited tokens, etc. In some embodiments, credentials are transmitted through secure pathways (e.g. using encryption).

In some embodiments, credentials are used in a two-step authentication process. For example, the authentication may require: (i) a log-in and password for the ESP member to log-in the ESP system and (ii) a time-limited token to be generated based on an authentication request. In some embodiments, a role (as described above) may be combined with to create a three-step authentication process. For example, an administrator of the ESP could have designated roles for various ESP members and selected specific data categories to be made accessible for each role.

In contrast to system-generated credentials which must be created, stored and managed in specific ways, roles can be assigned by the admin to each member of the ESP. For example, roles can include admin, agent, call taker, supervisor, manager, etc. In contrast to credentials, roles do not need to be verified by system as they are usually admin-defined. In addition, the admin can update the role of an ESP member to accurately reflect changes in jobs, positions and responsibilities. In this way, the use of the roles allows the admin to customize the management portal to reflect the organizations under their supervision. In some embodiments, an ESP member can have multiple admin-defined roles.

In some embodiments, the authentication of the data request may be through the use of a credential, which is included in the data request (e.g. in the header of the request). When the emergency clearinghouse receives the request, the credential (e.g. a token) is verified to ensure that it is valid and has not expired. In some embodiments, the data request may also include an identifier for the admin-defined role for the ESP member.

In some embodiments, the ESP member or user is subscribed to the emergency data received within the ESP jurisdiction, as described above and below. In this way, the credential system ensures that emergency data that is relevant for the ESP member is accessible and updates are available quickly and efficiently.

Due to the diversity of ESP members (e.g. call dispatcher, PSAP manager, police, and paramedic) and the need for accurate and relevant data, there are specific challenges for emergency response. Although system-defined credentials may also be used to restrict access to emergency data, admin-defined roles were incorporated to allow the customization needed for different ESP members. In this way, the present system allows for both secure authentication and significant customizations for managing access to emergency data for various members of the organization.

Figure 2:
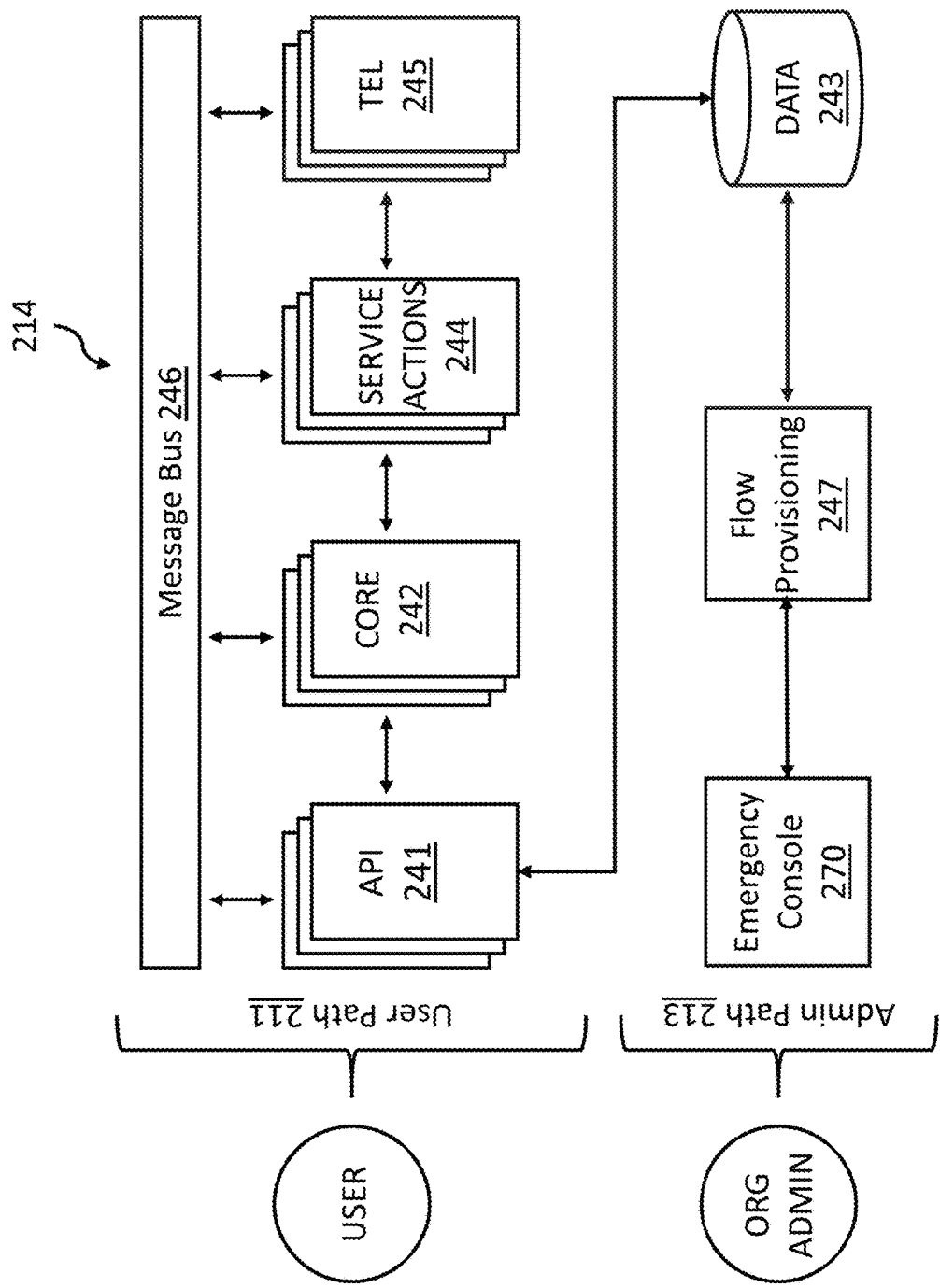
FIG. 2 is a block diagram of an emergency flow management system (EFMS), according to some embodiments of the present disclosure.

FIG. 2 depicts an exemplary embodiment of an emergency flow management system (EFMS). As depicted in FIG. 2, in some embodiments, the EFMS 214 contains two pathways: an administrator pathway 213 (admin path) and a user pathway 211 (user path). The admin path 213 is initiated by an administrator of a device or application, as described above. In the admin path, the administrator accesses an emergency flow editor 270 to configure an emergency flow to fit the needs of the administrator's product or service. In some embodiments, in the admin path, an emergency flow provisioning module 247 compiles the emergency flow into an emergency flow script, assigns an emergency flow ID to the emergency flow script, and stores the emergency flow script within a data module 243. Finally, the EFMS provides the administrator with an emergency flow trigger script including the emergency flow ID, which the administrator can integrate into their device or application. The user path 211 is initiated by a user, or a device associated with a user, of the product or service provided by the administrator. In some embodiments, in the user path, the API module 241 receives an electronic notification including the emergency flow ID from a device or application that the administrator has integrated the emergency flow trigger script into. In some embodiments, the API module 241 then references the data module 243 with the emergency flow ID to identify the emergency flow script corresponding to the emergency flow ID and delivers the emergency flow script to the core module 242 for execution. In some embodiments, the core module 242 then employs the service actions module 244 and the telephony module 245 to execute the various functions included in the emergency flow script. In some embodiments, the API module 241, the core module 242, the service actions module 244, and the telephony module 245 are separately and simultaneously in communication with the message bus 246, which facilitates and coordinates synchronous and asynchronous communication functions (e.g., a communication bridge, text messages, etc.) between the modules and various users and accounts (e.g., a user, emergency contacts, emergency responders, etc.). In some embodiments, the electronic notification including the emergency flow ID also contains emergency data, such as user data, location data, or any other additional data, according to the administrator's use case. In some embodiments, emergency data ingested by the EFMS 214 is received and shared by the emergency clearinghouse, as described above.

Emergency Response Application

As mentioned above, in some embodiments, data and information is shared between the emergency response data platform (ERDP) and an emergency service provider (ESP) through an emergency response application. In some embodiments, as described in further detail below, the emergency response application may additionally be provided to an ESP to: a) facilitate communications between the ESP and an emergency caller (e.g., a person requesting emergency assistance) or b) facilitate communications between the ESP and one or more other ESPs. In some embodiments, the emergency response application is a software application either installed on a computing device at the ESP or accessed via the internet through a web browser on the computing device (e.g., the emergency response application is hosted on a cloud computing system by the ERDP). In some embodiments, the emergency response application functions to both facilitate a two-way communication link between the ERDP and the ESP and visualize data (e.g., emergency data) received by the ESP from the ERDP. The emergency response application optionally includes various components, such as a frontend application (hereinafter "graphical user interface" or "GUI"), a backend application, an authorization module, and a user database. In some embodiments, the emergency response application additionally or alternatively includes a credential management system or a geofence system (which may include or be otherwise communicatively coupled to a credentials database or a geofence database). In some embodiments, the credential management system and the geofence system are external to the emergency response application and communicatively coupled to the emergency response application (e.g., the credential management system or geofence system can be housed or hosted on a cloud computing system by the ERDP). Any or all of the components of the emergency response application may be hosted on a cloud computing system by the ERDP, a computing device at an ESP, or some combination thereof.

In some embodiments, the emergency response application is a webpage or web application that can be accessed through an internet or web browser. In such embodiments, the emergency response application can be quickly and easily integrated into the systems used by emergency service providers (ESPs), such as public safety answering points (PSAPs), because accessing and using emergency response application requires no additional software or hardware outside of standard computing devices and networks. As previously discussed, one of the greatest hindrances that PSAPs face in providing emergency assistance to people experiencing emergency situations is in acquiring accurate locations of the emergencies and the people involved, because PSAPs are currently typically limited to verbally asking for and verbally receiving locations from callers. In some embodiments, the clearinghouse is capable of receiving accurate locations (as well as additional emergency data, as described above) from electronic devices such as smartphones and delivering the accurate locations to the appropriate PSAPs during emergency situations. Therefore, it is advantageous to provide the emergency response application to PSAPs in the form of a webpage accessible through a standard web browser, in order to provide the potentially life-saving information stored within the clearinghouse to those capable of providing emergency assistance as quickly and easily as possible. However, in some embodiments, the emergency response application is a software application installed on a computing device at an ESP. The emergency response application may be provided by the ERDP or by a third-party.

Figure 3:
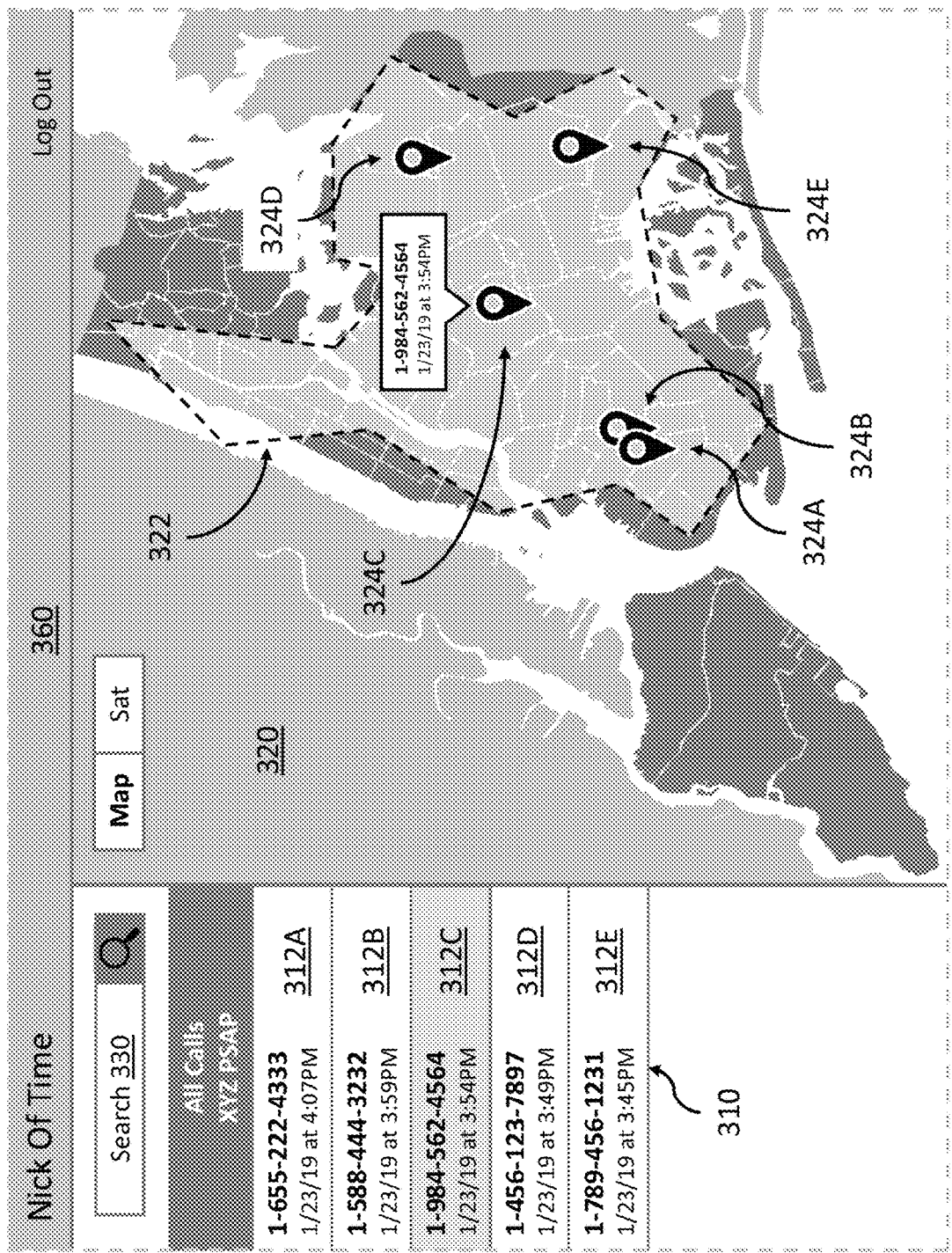
FIG. 3 illustrates a graphical user interface (GUI) provided by an emergency response application, according to some embodiments of the present disclosure.

FIG. 3 illustrates an embodiment of a graphical user interface (GUI) provided by an emergency response application 360. In some embodiments, the GUI provides interactive elements that allow a user at an ESP to receive data from the ERDP, visualize data received from the ERDP, and transmit data to the ERDP. For example, in some embodiments, the GUI includes an entry field 330 through which a user can submit a device identifier, such as by typing or pasting the device identifier into the entry field 330. In some embodiments, after submitting a device identifier through the entry field 330, the user can prompt the emergency response application to generate and send an emergency data request by selecting a search button. The emergency response application 360 then generates an emergency data request including the device identifier and any other necessary information (e.g., a temporary access token) and transmits the emergency data request to the ERDP. The ERDP can then return any available emergency data associated with the device identifier to the emergency response application 360, as described above and below. In another example, in some embodiments, the emergency response application 360 can automatically receive emergency data from the ERDP for emergencies relevant to an ESP (e.g., emergencies located within the jurisdiction of the ESP) without requiring a user to generate an emergency data request, as described above and below. After receiving emergency data from the ERDP, the emergency response application 360 can then visualize the emergency data within the GUI of the emergency response application 360. For example, in some embodiments, the emergency response application 360 includes a list of incidents 310 and an interactive map 320, as illustrated by FIG. 3. As shown, in some embodiments, when the emergency response application 360 receives a location (e.g., an emergency location) and a device identifier associated with an emergency occurring within the jurisdiction 322 of the receiving ESP, the emergency response application 360 displays the location associated with the emergency within the interactive map 320 as a location marker 324 (also referred to as an "incident location") and displays the device identifier associated with the emergency within the list of incidents 310 as an incident 312.

In addition to emergency locations, the emergency response application 360 can receive and visualize numerous types of emergency data from the ERDP. For example, the emergency response application 360 can receive additional data regarding an emergency, such as demographic or medical data associated with a person involved in the emergency (e.g., an emergency caller). In another example, the emergency response application 360 can receive data from sensors associated with the emergency, such as heart-rate data collected by a sensor on an emergency caller's smartwatch. Or, for example, the emergency response application 360 can receive data regarding emergency response assets available for an emergency, as described below. In some embodiments, the emergency response application receives and visualizes messages received from emergency callers or other ESPs, as described below. The emergency response application 360 can visualize any emergency data received from the ERDP within the GUI of the emergency response application.

Emergency Data Transmission

FIGS. 4A and 4B depict systems and processes for receiving and transmitting emergency data by an emergency response data platform in accordance with some embodiments of the present disclosure. As described above, in some embodiments, an emergency response data platform (ERDP) maintains a clearinghouse that obtains and shares emergency data to aid emergency service providers (ESPs) in responding to emergencies. For example, as depicted in FIG. 4A, during an emergency, an ESP 430A can send a query for emergency data (also referred to as an "emergency data request") to the ERDP 410 (e.g., through an emergency response application 460A, as described above) for a particular emergency, and, in response, the ERDP 410 can send any available emergency data associated with the emergency back to the ESP 430A (such as through emergency response application 460A). In some embodiments, as described above, the emergency response application 460A includes an identifier associated with an emergency alert in the emergency data request. The ERDP 410 can then use the identifier associated with the emergency alert to retrieve emergency data associated with the emergency alert from the clearinghouse 420. For example, as described above, an ESP 430A (e.g., a public safety answering point (PSAP)) can receive an emergency alert in the form of a 9-1-1 phone call 432 (representative of an emergency or potential emergency) from a mobile phone 400A associated with a phone number (e.g., (555) 555-5555). The ESP 430A can then send an emergency data request including the phone number (i.e., the identifier associated with the emergency alert) to the ERDP 410, which can then retrieve any emergency data within the clearinghouse 420 associated with the phone number and return the available emergency data to the requesting ESP 430A. This process of returning emergency data to an ESP in response to an emergency data request is referred to as "pulling" emergency data from the clearinghouse.

As described above, in some embodiments, the emergency response data platform (ERDP) can "push" emergency data from the Emergency Clearinghouse to emergency service providers (ESPs), such as by using an emergency data subscription system (hereinafter, "subscription system"). FIG. 4B depicts a flow diagram of a process for pushing emergency data from the Emergency Clearinghouse to one or more ESPs. In some embodiments, a member of an ESP (e.g., a PSAP staff member) logs into the emergency response application 460B at an ESP system 430B (e.g., a computing device associated with the ESP) by accessing the emergency response application 460B (e.g., by navigating to the emergency response application 460B through a web browser) and submitting their login information through the GUI of the emergency response application 460B. In some embodiments, when the ESP member logs into the emergency response application 460B by submitting their login information, the emergency response application 460B or ERDP 410 then determines an ESP account ID associated with the ESP member's account and establishes a persistent or active communication link (e.g., a websocket connection) with the ESP system 430B, thereby automatically subscribing the ESP console to the ESP account ID for the duration of their login session. Then, as described above, when the ERDP 410 receives an emergency alert including a location (e.g., when an emergency call is made from an electronic device 400B and sends an emergency alert to the ERDP 410 including a location generated by the electronic device 400B), the ERDP 410 retrieves a geofence associated with every ESP registered with the ERDP 410 and determines if the location falls within any of the geofences. In response to determining that the location falls within a geofence associated with the ESP associated with the ESP account ID, the ERDP 410 then associates the location with the ESP account ID, determines if there are any active or persistent communication links between the ERDP 410 and any computing devices subscribed to the ESP account ID. In this instance, because the ESP system 430B is subscribed to the ESP account ID and actively linked to the ERDP 410 through the persistent or active communication link, the ERDP 410 automatically pushes (e.g., from the clearinghouse) the emergency alert or emergency data associated with the emergency alert (e.g., the location, a phone number, etc.) to the ESP system 430B for display within the emergency response application 460B. In some embodiments, emergency alerts or emergency data associated with emergency alerts that have been pushed to an ESP are displayed within a jurisdictional awareness view, as described below.

For example, ESP system 430B and ESP system 430C are two different ESP consoles associated with the same ESP (e.g., two computing devices at the same public safety answering point (PSAP)), PSAP A. ESP system 430D is associated with a second ESP, PSAP B. One day, PSAP call-takers access and successfully log into the emergency response application 460 (emergency response application 460D-460D) at each of the three ESP systems (ESP systems 430B-430D), thereby establishing three separate active communication links, one active communication link between the ERDP 410 and each of the three ESP consoles. The ESP consoles are automatically subscribed by the ERDP 410 to the ESP account IDs associated with their respective ESPs (ESP ID A for PSAP A and ESP ID B for PSAP B). Both PSAP A and PSAP B are associated with only one geofence, geofence A and geofence B, respectively. Geofences A and B do not overlap, especially for primary agencies which have authoritative jurisdiction. The geofences have previously been tagged within the ERDP 410 with their respective ESP account IDs (e.g., during a registration process for the emergency response application). It is contemplated that an ESP (e.g., a PSAP) may be associated with one or more geofences or sub-geofences. For example, the area where emergency calls may be made versus another area where text messages to 911 may be made. In another example, an ESP agency may have a specific geofence for responding to a specific type of emergency, e.g., medical emergency geofence.

Later that day, an emergency call is made from communication device 400B, which causes communication device 400B to generate a first emergency alert including a first location of the communication device 400B and transmit the first emergency alert to the ERDP 410. When the ERDP 410 receives the first emergency alert, the ERDP 410 retrieves some or all of the geofences stored within the ERDP 410 and determines if the first location falls within any of the geofences stored within the ERDP 410. In this example, the ERDP 410 determines that the first location falls within geofence A, associated with PSAP A. In response, the ERDP 410 tags the first location with the ESP account ID associated with geofence A, ESP ID A. The ERDP 410 then determines if there are any active communication links between the ERDP and any ESP consoles subscribed to ESP ID A and automatically pushes (e.g., from the clearinghouse) the first emergency alert to those ESP consoles. In this example, both ESP system 430B and ESP system 430C are subscribed to ESP ID A, so the ERDP 410 automatically pushes the first emergency alert to both ESP system 430B and ESP system 430C for display within emergency response applications 460B and 460C, respectively, such as through a jurisdictional awareness view (as described below). The first location does not fall within geofence B, because geofence A and geofence B do not overlap, so the first emergency alert is not pushed to ESP system 430D, even though an active communication link has been established between the ERDP 410 and ESP system 430D.

Three minutes later, the ERDP 410 receives an emergency alert from electronic device 400D (e.g., a home security system) including a second location of the electronic device 400D. When the ERDP 410 receives the second emergency alert, the ERDP again retrieves some or all of the geofences stored within the ERDP 410 and determines if the second location falls within any of the geofences stored within the ERDP 410. In this example, the ERDP 410 determines that the second location falls within geofence B, associated with PSAP B. In response, the ERDP 410 tags the second location within the ESP account associated with geofence B, ESP ID B and automatically pushes the second emergency alert to ESP system 430D for display within emergency response application 460D, because ESP system 430D has an active communication link established with the ERDP 410 and ESP system 430D is subscribed to ESP ID B. The ERDP 410 does not push the second emergency alert to ESP system 430B or ESP system 430C. Although ESP system 430B and ESP system 430C have active communication links established with the ERDP 410, they are not subscribed to ESP ID B, and geofence A and geofence B do not overlap, meaning the second location does not fall within geofence A. Two minutes after that, the ERDP 410 receives an emergency alert from electronic device 400C (e.g., an intelligent vehicle system) including a third location of the electronic device 400C. The ERDP 410 determines that the third location falls within geofence A (like the first location included in the first emergency alert) and thus automatically pushes the third emergency alert to both ESP system 430B and ESP system 430C for display within emergency response application 460B and 460C. In some embodiments, emergency response application 460B and emergency response application 460C display the first emergency alert and the third emergency alert simultaneously, such as through a jurisdictional awareness view, as described below.

Jurisdictional Awareness View

In some embodiments, the systems, applications, servers, devices, methods, and media of the instant application provide a jurisdictional awareness view within the emergency response application. In some embodiments, the jurisdictional awareness view enables an ESP to view one or more ongoing or recently received emergency alerts (e.g., emergency calls) within one or more geofenced jurisdictions. Although not shown, electronic emergency alerts based on alarms or sensors, activation of a panic button, etc. may be displayed in a similar fashion wherein the emergency alerts are not emergency calls. FIG. 3 illustrates the jurisdictional awareness view displayed within the emergency response application, in accordance with one embodiment of the present disclosure. In some embodiments, the jurisdictional awareness view includes a list of incidents 310 that displays one or more incidents 312 associated with one or more device identifiers (e.g. phone numbers, IP addresses). In some embodiments, the jurisdictional awareness view additionally or alternatively includes an interactive map 320 that displays one or more incident locations 324 associated with the one or more incidents 312 associated with the one or more device identifiers, as described below. In some embodiments, the jurisdictional awareness view displays incidents and incident locations only for emergencies occurring within the jurisdiction 322 of the ESP at which the emergency response application 360 is being accessed.

For example, in the example illustrated in FIG. 3, an ESP has accessed an emergency response application 360 provided by the ERDP. In this example, the ERDP has pushed emergency data associated with five different emergency alerts to the ESP (as described above) through the emergency response application 360. Accordingly, the emergency response application 360 displays five different incidents 312 (e.g., incidents 312A-312E) within the list of incidents 310 and five corresponding incident locations 324 (e.g., incident locations 324A-324E) within the interactive map 320. As illustrated by FIG. 3, in some embodiments, incidents 312 and incident locations 324 may be selected or hovered over to highlight a particular incident 312. In this example, incident 312C and its corresponding incident location 324C have been selected and highlighted. In some embodiments, selecting a particular incident 312 or corresponding incident location 324 prompts the emergency response application 360 to display additional information associated with the particular incident 312 (e.g., additional emergency data or information associated with the emergency alert for which the particular incident 312 was created). Because the jurisdictional awareness view can show an ESP numerous incidents 312 occurring within the jurisdiction 322 of the ESP simultaneously, the jurisdictional awareness view can provide the ESP with situational awareness that the ESP otherwise would not have. For example, with the knowledge that incidents 312A and 312B originated in close proximity and at approximately the same time, an ESP personnel (e.g., a call taker at a public safety answering point) can determine that the two incidents may be related to each other.

Sharing Emergency Data Communications

In some embodiments, a system for bidirectional information exchange between citizens and emergency personnel (e.g., first responders) sends out a mass notification message. In some embodiments, a mass notification message can be triggered due to a detection of an alert regarding a possible emergency condition. In some embodiments, an alert regarding a possible emergency condition may be generated by a device (a cell phone, wireless communication device, or a telephone landline). In some embodiments, an alert regarding a possible emergency condition may be generated by a public service answering point (PSAP) of an ESP, a telephone service provider, a telephone device manufacturer, or a public safety agency. In some embodiments, an alert regarding a possible emergency condition may be generated based on social media. In some embodiments, the mass notification message is sent in the form of a text, short message service (SMS), email, multimedia messaging service (MMS), Internet protocol (IP) messaging, or integrated public alert and warning system (IPAWS). In some embodiments, a link is embedded in the notification message for a citizen to engage with first responders. In some embodiments, the link can be, but is not limited to a hyperlink, a web real-time communication (WebRTC) link, a phone number, a web service endpoint, or an Internet protocol (IP) address.

In some embodiments, the notification message includes a survey form. In some embodiments, the survey form allows the user to input information such as an indication that the citizen is safe. In some embodiments, the survey form allows the user to input comments regarding the emergency conditions (e.g., smoke conditions, fire, flooding, etc.).

In some embodiments, the notification message can provide the user an option to upload a picture, image, or audio clip. In some embodiments, the notification message can provide the user an option to grant permission to an Internet of Things (IoT) sensor feed. In some embodiments, the notification message can provide the user an option to provide a web real-time communication (WebRTC) link where the user can share location, do a two way chat, or stream video.

In some embodiments, data from users can be delivered to emergency service providers (ESPs) (e.g., public safety answering point (PSAP) or first responders).

Figure 5:
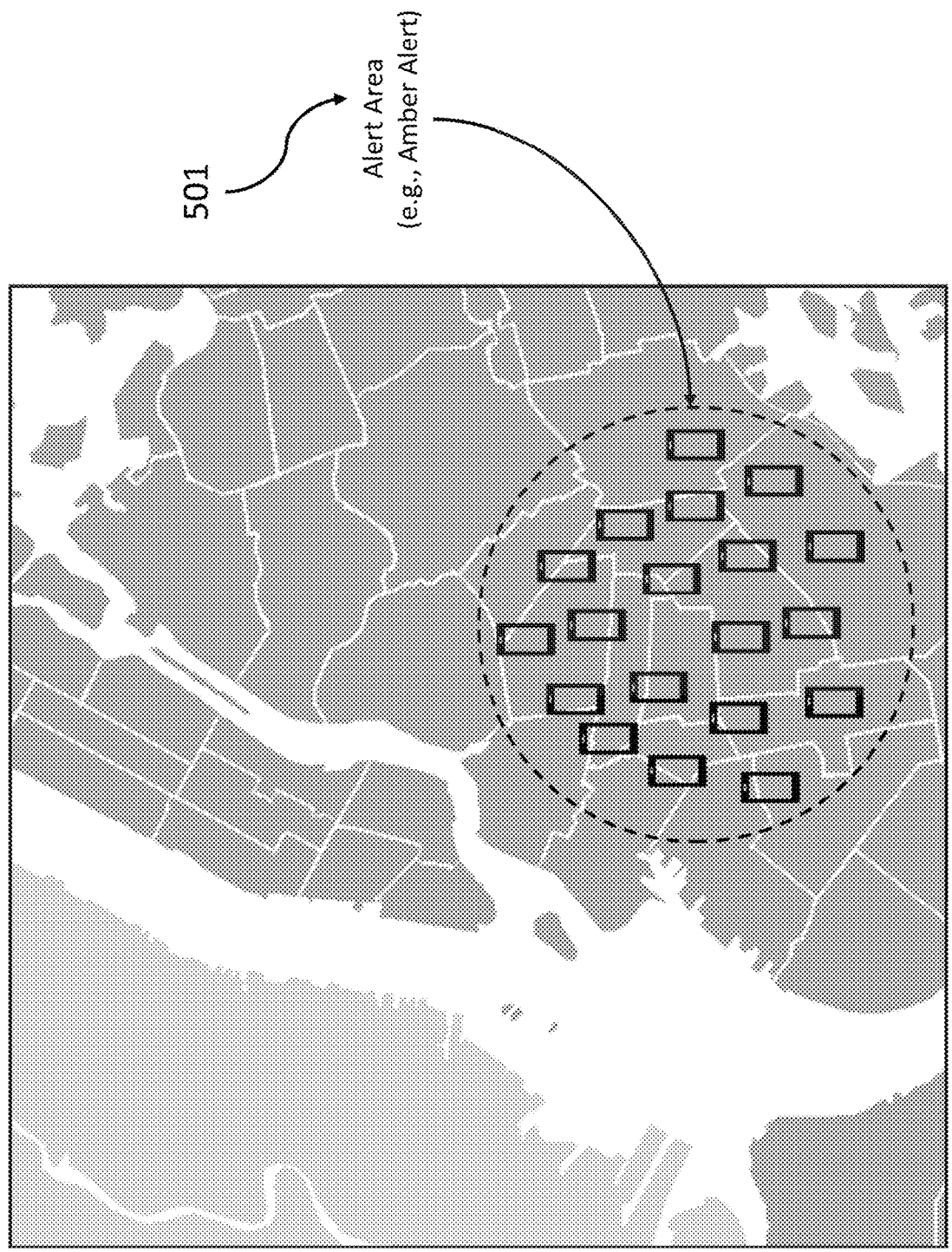
FIG. 5 illustrates a GUI provided by an emergency response application displaying an Alert Area, according to some embodiments of the present disclosure.

FIG. 5 illustrates an exemplary geographic area over which a mass notification message is sent out by citizen engagement system 116. In some embodiments, notification messages can be targeted based on geography (e.g., message is sent to people in a disaster zone). In some embodiments, notification messages can be targeted based on the demographic group (e.g., message is sent to elderly people). In some embodiments, notification messages can be targeted based on certain characteristics of the citizens (e.g., occupation, age, gender, etc.). For example, notification targets are senior citizens (above 65 years) in the impact area of a hurricane, such that both location of the device and user information (age) are used to determine the target devices. In some embodiments, the notification messages are targeted towards people who a) are currently on an emergency phone call, b) have initiated an emergency call, but have not been connected, c) were disconnected from an emergency call, or d) unable to place an emergency call due to an emergency line outage or lines being busy. However, the embodiments of this disclosure are not limited to these examples and can include other emergency situations. An exemplary illustration for a notification target is shown in FIG. 5 based on an area alert 501 (e.g., amber alert). In some embodiment, user devices located within an estimated geographic area associated with the emergency condition are identified as target devices for sending a notification message. In some embodiments, device identifiers (e.g., phone numbers, IP addresses, etc.) can be obtained for a service provider (e.g., a cellular service provider, a telephone landline provider, an internet service provider). In some embodiments, device identifiers may be obtained from the device manufacturers (e.g., cellphone manufacturers) or from a public safety agency. The target devices may be sent a survey to fill out and citizens may be asked if they have seen something that may help in fighting crime. The notification recipients can respond to the survey and if available, submit photo or video of what they had seen. In this way, citizens can be prompted provide information to solve crimes.

In one example, a system for bidirectional information exchange between a group of citizens and emergency personnel (including first responders) is contemplated. Initially, an embedded message is sent to the target group of devices. The group of devices may be selected based on one or more factors including location of devices and user data (e.g., age/demographic, gender, occupation, medical). In some embodiments, the group of target devices were determined as recipients of an area alert such as an area alert. The message that is sent to group of devices (also referred to as a mass notification), may be a SMS (e.g., text, data), MMS, IP messaging (e.g., web push), IPAWS, social media messaging or a similar method of messaging. In some embodiments, recipients may be prompted to complete a survey (indicate that they are safe, comment on smoke conditions, flooding, etc.). In some embodiments, the recipient may provide permission to share sensor feed with emergency personnel, such as camera feed or sending an image or voice recording. Additionally, a link may be provided to share location, ability for one or two-way chat, or video streaming. In some embodiments, a transcript of the voice recording or summary of a video may be provided to emergency personnel through this channel.

Credential Management System & User Database

As previously discussed, it is advantageous to provide rigorous security precautions and functions specifically created and suited for the emergency response application 860 in such embodiments wherein the emergency response application is accessible as a webpage through standard web browsers. In some embodiments, as mentioned above, the emergency response application includes a user database (not shown) and is communicatively coupled to a credential management system (not shown). In such embodiments, the user database and the credential management system function cooperatively to secure the emergency response application and the emergency data stored within the clearinghouse. Unlike the emergency response application, which can be accessed through public networks and servers, the credential management system can be securely connected to the clearinghouse through private networks and servers. In this sense, the credential management system can serve as a protective barrier between the emergency response application and the clearinghouse, as described above.

In some embodiments, when an ESP administrator (e.g., a PSAP administrator) requests access to the emergency response application on behalf of an ESP, an organization (also referred to as an "org") is created for the ESP within the credential management system. Concurrently, an organization identifier (also referred to as an "org ID") is created for the organization within the credential management system. When the request is granted, a long-lived credential (hereinafter, "credential") is created for the ESP within the credential management system. In some embodiments, the credential never expires. In some embodiments, the credential expires after an extended period of time, such as a year. In some embodiments, multiple credentials are created for a single organization. As an example, in the event that a credential is compromised, the credential is deactivated, and a new credential is created for the organization. Alternatively, multiple credentials are created for a single organization, and in some embodiments, the credential management system periodically cycles through the credentials by activating one and deactivating the others to provide an additional layer of security.

In some embodiments, whenever an account is created within the emergency response application, the account is stored within the user database and populated with information regarding the account, such as a name of the ESP member for which the account was created, an email address, and the name of the ESP. In some embodiments, a temporary password is created for and stored with the account in the user database. Concurrently with storing the account within the user database, an account node is created within the credential management system and a system ID is generated for the account node. The emergency response application 860 then stores the system ID in the account stored within the user database. In this way, the system ID serves as a link between an account stored within the user database and a correlated account node stored within the credential management system. The emergency response application 860 then requests information regarding an account node stored within the credential management system using the system ID associated with the account node, as described below. In some embodiments, organizations, organization IDs, users, and system IDs, and credentials are stored within a credential management system database (not shown). In some embodiments, the credential management system is a software module included in the ERDP. In some embodiments, the credential management system is a third-party service. As an example, an API management service, such as Apigee, may be used as a credential management system.

Login Flow

In some embodiments, once a request for access to the emergency response application 860 from an ESP administrator has been approved, the ESP administrator and any account created by the ESP administrator is able to log into the emergency response application and request emergency data from the clearinghouse through the emergency response application. To log into the emergency response application 860, any account holder (i.e., registered user) can navigate to a login page within the GUI 880 of the emergency response application 860 and submit the email address and password associated with their account (e.g., "login information"). If the login information is correct, the emergency response application 860 can grant the account holder access to the emergency response application 860 and display the dashboard within the GUI, as depicted in FIGS. 8-11. In some embodiments, alternate information is used as login information. For example, in some embodiments, login information comprises a username, employee ID, or other suitable identifying information for an account holder.

Emergency Verification

Due to a large number of false alarms, it is important to verify that there is an emergency before sharing emergency submission from a user with an agency. In some cases, the user device may send a submission by mistake and a process for canceling the submission may be available. In some embodiments, the user may be prompted to confirm that they are in an emergency. A delay timer may be utilized to send the submission unless there is user confirmation, as seen in some cases, that the user may not be in a capacity to confirm.

It is contemplated that the submission may be verified in various ways to confirm that there is genuine emergency. The user may be prompted to provide a name and/or age (e.g., only adult submissions may be forwarded). Here, the user may be prompted to speak out the emergency and the voice recording may be analyzed for verification.

In some embodiments, verifying the emergency involves receiving, from each communication device of the plurality of communication devices, a confirmation of an emergency data submission. For example, when a submission is received from a communication device, a message is sent to the device to confirm that the user or someone in proximity is in need of emergency help.

In some embodiments, the emergency location has to be confirmed. In some embodiments, verifying the emergency involves verifying that the location corresponding to an emergency data is within an estimated geographic area that is associated with an emergency. In some cases, the user will be prompted to confirm the location address or location pin. In some cases, the user may be prompted to share the device location to confirm that the device is within the affected area. This feature will be helpful as the user may be residing in the affected area, but may be currently outside the area.

In some embodiments, the user may be calling on behalf of another person who may or may not be available. Here, the submission may ask the user to confirm whether he or she is the person in need of emergency help. If the user is reporting an emergency on behalf of the victim, additional verification may be done by asking follow-up questions to the user. In some embodiments, verifying the emergency involves verifying that a communication device of the plurality of communication devices is not in a list of blocked devices.

In some cases, the ERDP may contact the person in the emergency directly for emergency verification (e.g., phone verification or SMS verification). In some cases, the victim may be incapacitated and may not be able verify the emergency and another person (e.g., a passerby) may verify the emergency with or without audio visual data (e.g., a picture of the incapacitated victim).

FIG. 6 illustrates exemplary notification messages displayed on screens of target user devices (e.g., citizens who are located in an affected area), in accordance with some embodiments of this disclosure. Screen 600 shows an example of a notification message (e.g., a push notification) sent to a user device, by the citizen engagement system 116 of the ERDP 110. As shown on screen 620, the notification message can include an embedded link. The user may be provided an option to get help, to receive additional details regarding the emergency condition, and/or clear/delete the notification. Additionally or alternatively, the citizen engagement system 116 may send a notification message via a short message system (SMS) text message, social media messaging or similar methods of messaging. As shown on screen 640, the notification message can have an embedded link 648 (e.g., a hyperlink, a WebRTC link, a phone number, etc.) that can be used by the user to request help or to provide additional information regarding the emergency condition.

Figure 7:
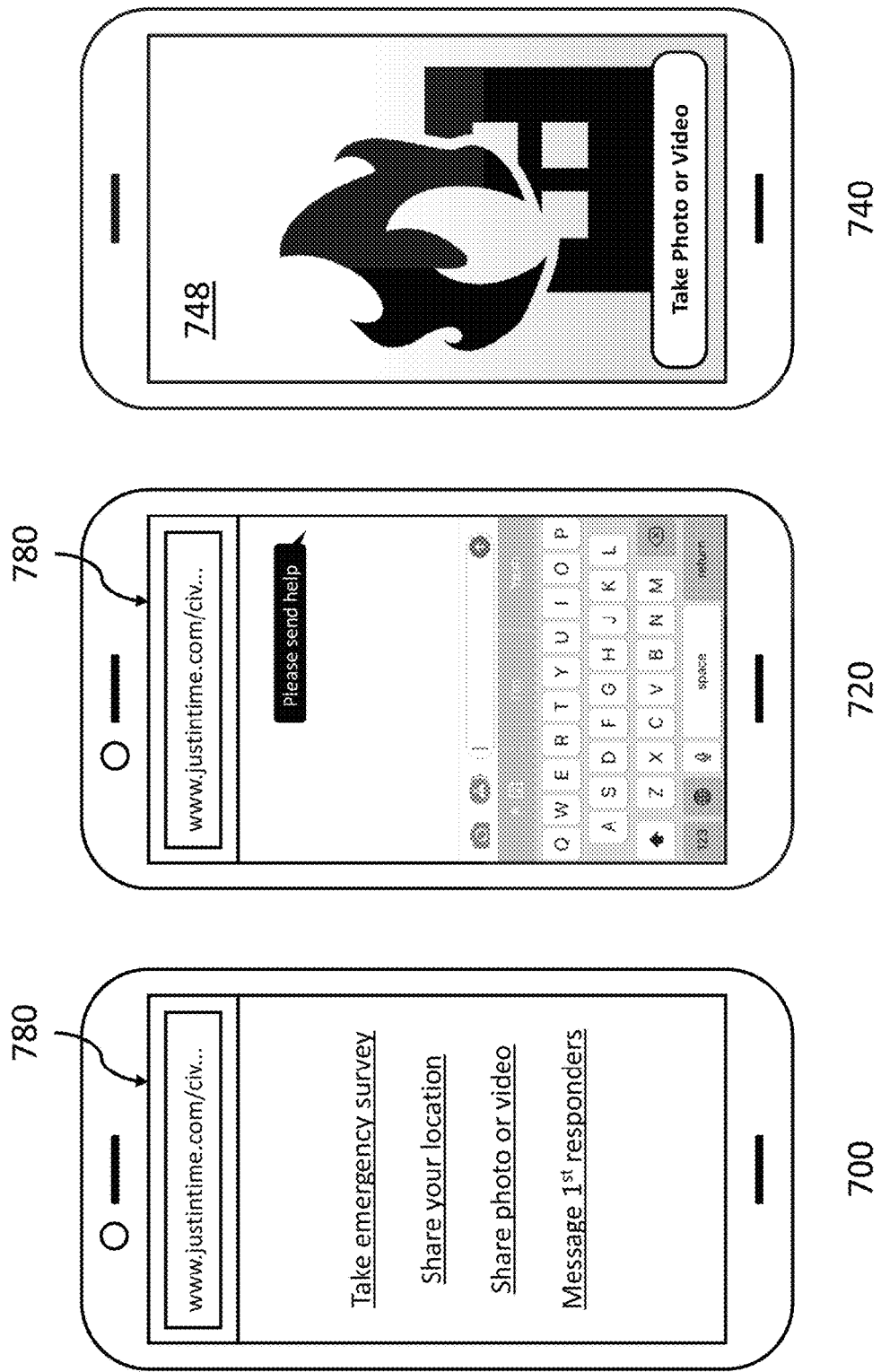
FIG. 7 illustrates engaging with emergency responders through web application, according to some embodiments of the present disclosure.

FIG. 7 illustrates exemplary options that may be provided to a user for responding to a notification message, in accordance with some embodiments of this disclosure. As shown on screen 700, the user may be provided with an option to complete an emergency survey. In some embodiments, the survey form allows the users to provide information regarding the emergency condition. Additionally or alternatively, the user may be provided an option to share their location. Additionally or alternatively, the user may be provided an option to share a photo or video that may provide additional information regarding the emergency condition. Additionally or alternatively, the user may be provided an option to send a message text or voice message to first responders. Exemplary screen 720 shows a response from the user via a text message (e.g., "Please send help," etc.) from the user. As shown on screen 740, a user may take a photo or video of the emergency condition (e.g., a fire) and send the photo or the video 748 to citizen engagement system 116 via the provided link.

Figure 8:
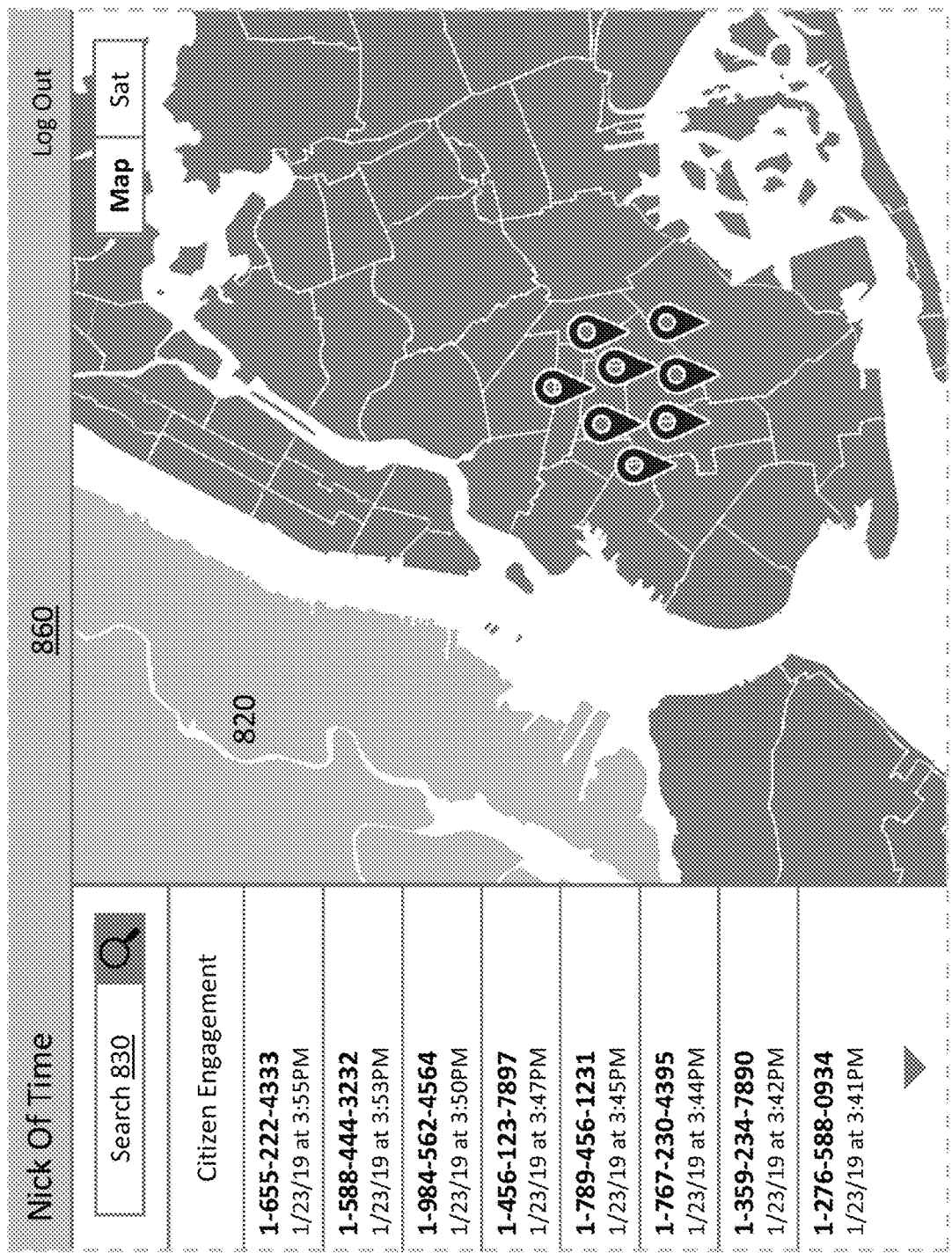
FIG. 8 illustrates a GUI displaying location markers, according to some embodiments of the present disclosure.

FIG. 8 illustrates an exemplary embodiment of the GUI provided by the emergency response application 860, in accordance to some embodiments of this disclosure. In some embodiments, the emergency response application 860 receives emergency data corresponding to user responses from the ERDP (e.g., ERDP 110 of FIG. 1). After receiving emergency data from the ERDP, the emergency response application 860 can then visualize the emergency data within the GUI of the emergency response application 860. For example, the emergency response application 860 displays the locations associated with the received emergency data as location markers (e.g., emergency locations) within the interactive map 820. In some embodiments, each location marker is associated with an identifier of the user device corresponding to the marker. The emergency response application 860 may display a list of incidents corresponding to the location markers. The exemplary embodiment of FIG. 8 shows eight location markers within the map 820 and a corresponding list of incidents. Each entry of the list may display a device identifier associated with the corresponding location marker. In addition, a time stamp associated with each entry indicated the time at which an emergency incident was detected or reported. In some embodiments, the GUI includes an entry field 830 through which the user can perform a search over the list of incidents using device identifiers or the time-stamps.

Figure 9:
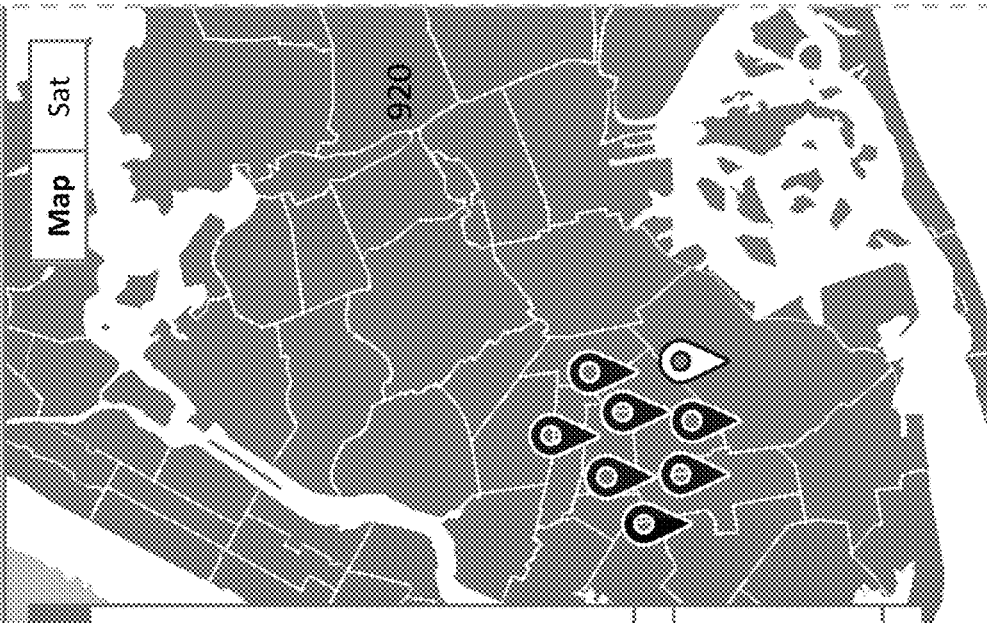
FIG. 9 illustrates a GUI displaying emergency data comprising a text message, according to some embodiments of this disclosure.

FIG. 9 illustrates an exemplary embodiment of emergency information visualized within the GUI of the emergency response application 960. The exemplary embodiment shows location markers corresponding to the locations associated with the received emergency information within the map 920 and a list of incidents corresponding to the location markers. In some embodiments, a user of the emergency response application 960 can select an incident from the list of incidents to display additional information corresponding to the incident. In the exemplary embodiment, selecting an entry from the list of incidents may display the responder's caller ID and an estimated address. For example, in some embodiments, selecting an entry from the list of incidents may display information provided by the respondent regarding the type and criticality of the emergency situation, as illustrated by FIG. 9. For example, in some embodiments, the displayed information includes the type of emergency (e.g., fire, flooding, smoke conditions, a vehicular pileup, etc.). For example, in some embodiments, the displayed information may include a message (e.g., a text message or a transcribed voice message) sent by the responder. In some embodiments, the displayed information may include last known GPS coordinates of the responding device. In some embodiments, the ERDP 110 may translate one or more types of emergency data (e.g., audio or video information of various formats) received from the respondents into a predefined format. The emergency response application 360 can display the formatted emergency data within the GUI of the emergency response application 360.

Figure 10:
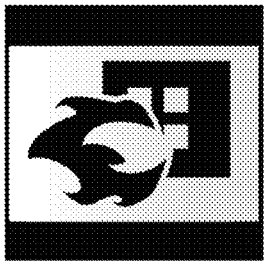
FIG. 10 illustrates a GUI displaying emergency data comprising a media file, according to some embodiments of the present disclosure.

FIG. 10 illustrates an exemplary embodiment of emergency information visualized within the GUI of the emergency response application 1060. In the exemplary embodiment, the displayed information includes multimedia data regarding an emergency condition. For example, when a user of the emergency response application 1060 selects an incident from the list of incidents, information corresponding to the emergency condition and an image of the emergency condition can be displayed, as illustrated by FIG. 10. In some embodiments, when a user of the emergency response application 1060 selects an incident from the list of incidents, information corresponding to the emergency condition and a video of the emergency condition can be displayed. In some embodiments, the user of the emergency response application 1060 can look at multiple images or video sent by multiple respondents to determine the progression of the emergency condition. (e.g., the direction of the spread of a fire or increase in water level during a flood). In some embodiments, ERDP 110 may use multiple photos of the emergency condition to generate a composite image and make it accessible to a user of the emergency response application 1060.

Grouping Emergencies and Collective Emergency Response

Traditionally, emergencies reported by emergency calls or text messages are dealt with in a chronological manner and distributed automatically via a call handling system. Existing system do not allow for automatic grouping for responding to emergencies collectively. Disclosed herein are system, apparatus, and methods for collective emergency response.

Figure 11A:
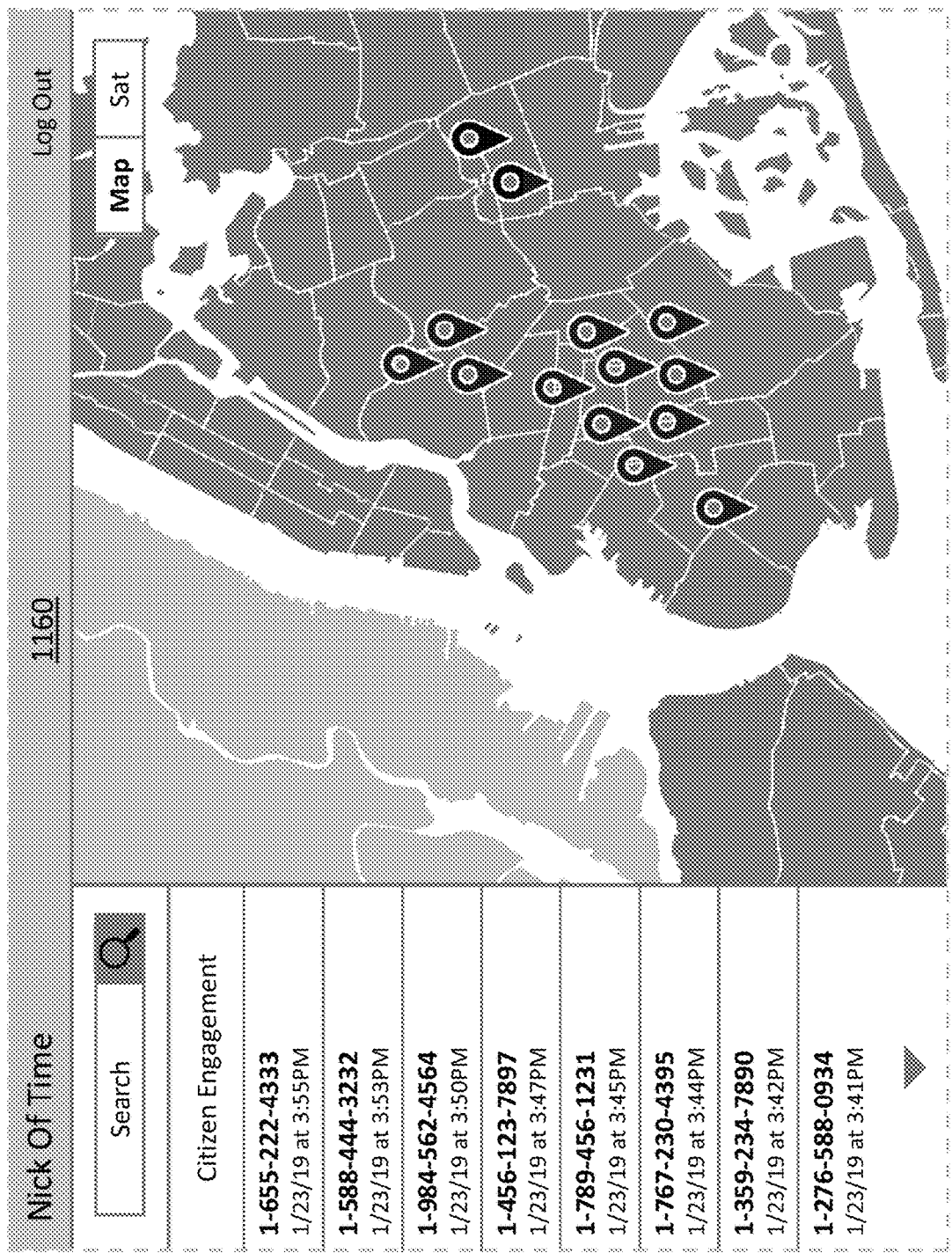
FIG. 11A illustrates a display of emergency incidents at an emergency service provider (ESP), according to some embodiments of the present disclosure.

FIG. 11A depicts a display of emergency incidents at an emergency service provider (ESP), e.g., a PSAP, a command center for a mass emergency, etc., according to some embodiments of this disclosure. A GUI with multiple emergency incidents (also referred to as "Emergency Incident View" on an interactive map is depicted. The GUI can include emergency response application 1160, according to some embodiments. In some embodiments, the displayed emergency incidents may correspond to a single emergency condition or to multiple unrelated emergency conditions.

It is understood that the emergency response application displayed at an ESP may be accessed or provided in various ways-standalone application on the ESP system, a cloud-based system accessed via the ESP system, a web portal hosted on the internet, etc.

Although not shown, this may be a jurisdictional view of all incidents within an ESP's jurisdictional boundaries (e.g., an authoritative jurisdiction) wherein the jurisdictional boundaries may also be displayed.

Emergency Clusters

Figure 11B:
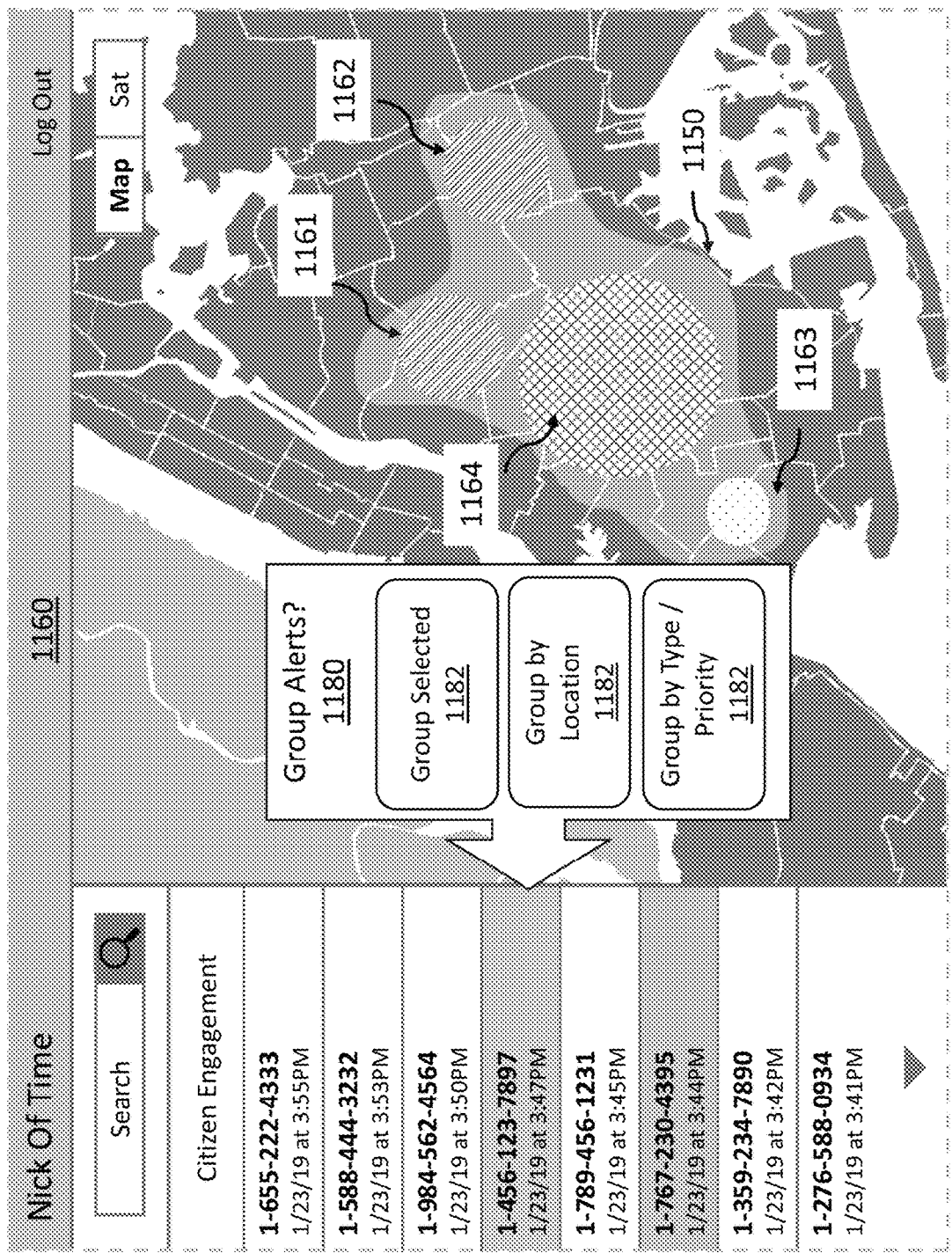
FIG. 11B illustrates a heatmap of emergency incidents on a display at an emergency service provider (ESP), according to some embodiments of the present disclosure.

FIG. 11B depicts a heatmap of emergency incidents on a display at an emergency service provider (ESP), according to some embodiments of this disclosure.

As shown, a density map of emergencies is shown instead of each emergency incident (also referred to as "Emergency Density View"), according to some embodiments. In some embodiments, there can be an advantage to the emergency density view opposed to the granularity in the emergency incident view. For example, first, there may be multiple emergency alerts (including emergency calls, emergency messages, sensor-triggered emergencies) that may be related to one emergency (e.g., a vehicular pileup, a fire, flooding, etc.). The emergency incident view allows the ESP user (e.g., the call taker/dispatcher) to view, group and respond to multiple emergency incidents efficiently. Second, the emergency density view can scale up better when dealing with a large number of emergency alerts related to a mass emergency, where a mass emergency is affecting a group of users within an affected area. Third, the emergency density view can be helpful for planning and allocation of emergency resources, especially when a large number of incidents are overwhelming existing resources. An additional advantage of the emergency density view may allow identification of a mass emergency affecting a large number of people as it is developing. By facilitating a collective emergency response, the emergency density view can be valuable tool for efficient response.

Emergency incidents may be grouped in various ways for collective emergency response. This is a paradigm shift from displays where emergency incidents were displayed chronologically and each emergency call was distributed to telecommunicators to intake and send for dispatching emergency response. In addition to responding collectively, grouping emergency incidents can link the emergencies for collective viewing, communicating, and documentation.

As shown, the ESP display allows an ESP user to group 1180 emergency incidents by selecting specific incidents in any order. In some embodiments, an ESP user can group 1182 the emergency incidents based on their location on the map. In some embodiments, an ESP user can group the emergency incidents based on their type or priority. In some embodiments, an ESP user can group emergency incidents based on their time-stamp. In some embodiments, an ESP user can group emergency incidents based on emergency incident density. In some embodiments, the emergency incidents may be grouped automatically based on a combination of emergency type, emergency priority, type of notification, emergency incident density, etc.

In this view, the emergency incidents may be visualized within an affected area 1150 are displayed as emergency clusters 1161, 1162, 1163, 1164 based on location of areas of high emergency incident densities. In some embodiments, the emergency response application may distribute the emergency incidents to specific ESP user positions, so that the same call taker or group of call takers are assigned to deal with related emergencies.

In some embodiments, the heatmap graphically represents an affected area of a mass emergency, e.g., 1164 may represent a commercial fire, while 1163 may represent a medical emergency. In this way, the heatmap view may allow for identification of a mass emergency, such as commercial fire in 1164 as a mass emergency that may impact a large number of people.

Emergency Cluster Thresholds

In some embodiments, a heatmap provided by the ERDP can automatically group a plurality of emergency incidents into an emergency cluster. For example, in some embodiments, the heatmap automatically groups a plurality of emergency incidents into an emergency cluster when a threshold number of emergency incidents occur (i.e., are associated with emergency locations) within a threshold distance of each other. In some embodiments, the threshold number of emergency incidents, or the threshold distance between them, to create an emergency cluster can be determined by the ESP user accessing the Emergency Density View.

In some embodiments, the threshold may be a number of emergencies within a specific area or a specific time window. For example, there may be a threshold of 10 emergencies within a 10 minute window within an ESP's jurisdictional boundaries. In some embodiments, the threshold may be defined as 2 or more emergency incidents within a distance of 1 km. In some embodiments, the emergency threshold is 5 emergency incidents within a distance of 10 meters. The embodiments of this disclosure are not limited to these examples and can include other number of emergencies and/or areas.

In some embodiments, warnings or notifications when emergency clusters are detected may be displayed on the ESP display. Although not shown, when a new cluster is detected as emergency calls and alerts are coming in to an agency, a warning may be displayed for all ESP users at that agency. Over time, the status of the cluster may be displayed on the ESP display, such as emergency cluster status (e.g., "two fire engines and one ambulance arrived on scene", "weapon detected", "one fatality confirmed").

In some embodiments, after an emergency cluster is created, an ESP user can adjust the size or shape of the emergency cluster, which may result in the addition or removal of one or more emergency incidents to or from the emergency cluster. In some embodiments, an ESP user can select an emergency cluster to be shown a map that includes only emergency locations for the emergency incidents grouped into the emergency cluster and a list of emergency incidents that includes only the emergency incidents grouped into the emergency cluster. In some embodiments, an ESP user can select an emergency incident within an emergency cluster and tag the emergency incident as representative of an emergency call made by a person experiencing an emergency or representative of an emergency call made by a person about an emergency (but who is not experiencing the emergency themselves). In some embodiments, an ESP user may select an emergency cluster to show a three-dimensional view of the emergency cluster, wherein the elevation of each of the emergency incidents included in the emergency cluster is shown graphically or in text.

Mass Casualty Incidents & Mass Emergencies

Mass Casualty Incidents (MCIs) are understood to be incidents or emergencies where the emergency service personnel and equipment are overwhelmed by the number or severity of casualties or injuries. Typically, the MCI designation is based on the resources that are ordinarily available in the locality. With disaster planning (e.g. an extreme weather warning), additional resources that are not ordinarily available in the locality can be used. In many cases, the emergency phone lines may be overwhelmed leading to busy emergency lines, dropped calls or long wait times. ESPs (e.g. PSAPs) may have varying criterion and response plans for MCIs.

Mass emergencies, as used herein, refers to one or more related emergencies that affects a group of people or has a high likelihood of affecting a group of people. In some embodiments, the mass emergency may affect 10-100 people, wherein the 10-100 people may need emergency assistance. In some embodiments, the mass emergency affects more than 25 people, wherein 25 people may need emergency assistance. In some embodiments, the mass emergency may affect less than 10 people, but there is a likelihood of high severity. For example, a mass emergency may be due to a natural disaster such as a hurricane, flooding, forest fire, earthquake, disease epidemic, disease pandemic, etc. In addition, a mass emergency may be due to terrorist activity, large accident, chemical spills, radiation leak, etc.

Social media may be a particularly powerful means of communication when emergency services have been overwhelmed or when a large group of people have been affected by one or more emergencies. If the Internet connectivity has not been affected, increase in social media activity can be used for early detection and efficient emergency response during MCIs and mass emergencies. In some embodiments, relevant posts and social media analytics may be an indication of a mass emergency. In particular, mass emergencies may be detected using analytics such trending topics or hashtags, social media content volume and key word sentiment severity.

Figure 11C:
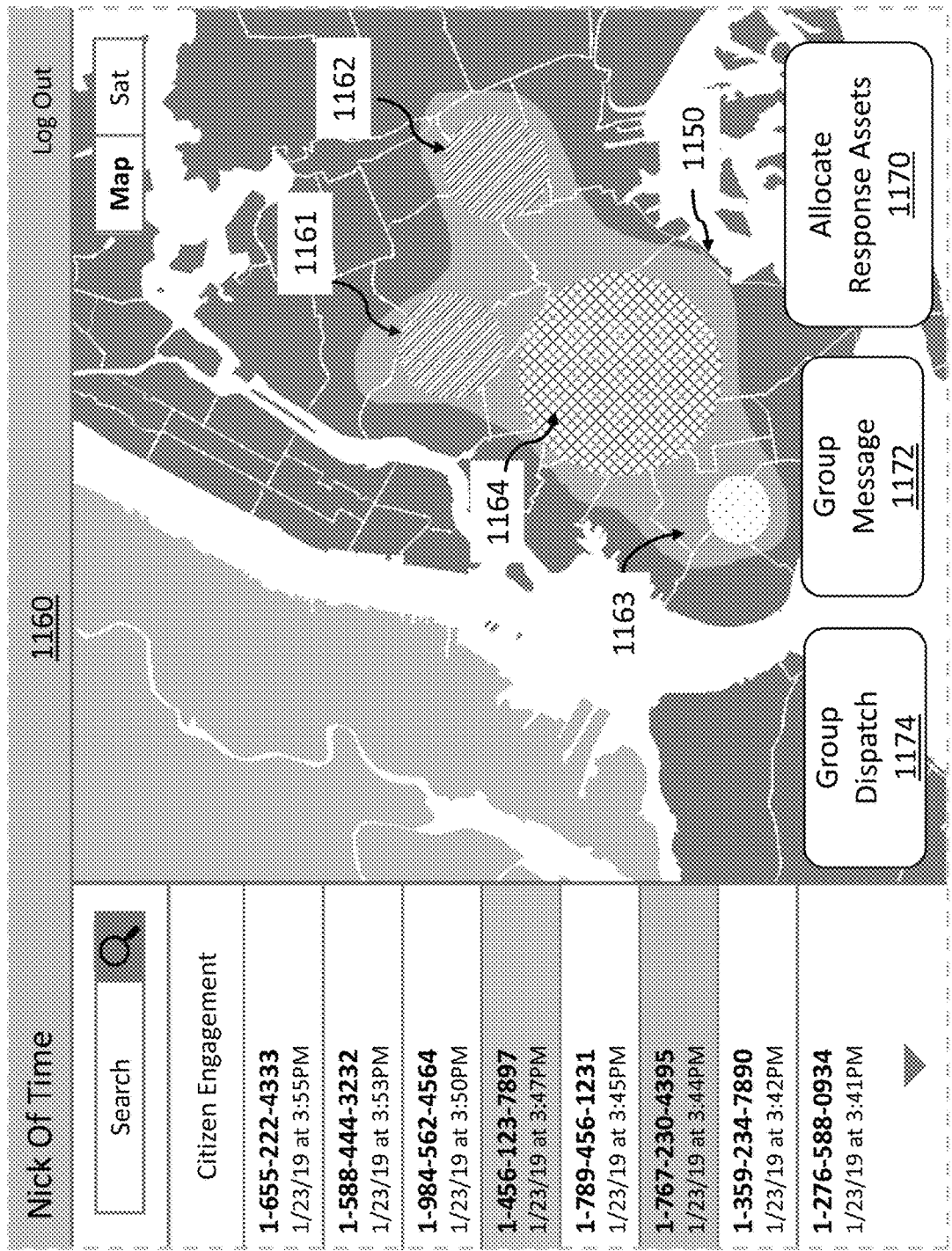
FIG. 11C illustrates a heatmap of emergency incidents wherein they are depicted as emergency clusters on a display at an emergency service provider (ESP), according to some embodiments.

FIG. 11C depicts a heatmap of emergency incidents wherein they are depicted as emergency clusters on a display at an emergency service provider (ESP), according to some embodiments.

Typically, emergency incidents are responded to individually and this tool allows for visualizing and grouping into emergency clusters. For example, the ESP may send a message to all the emergency incidents using the Group Message 1172 (e.g., "Emergency personnel on the way!"). In some embodiments, the group message could also send a submission from users to the devices as shown in FIGS. 5-7. In some embodiments, based on the one or more clusters of emergency incidents, the ESP may determine an estimate of a number of emergency response assets 1170 (e.g., ambulances, fire engines, patrol cars, drones, tow trucks, etc.) that are to be dispatched to the emergency locations.

As shown, the ESP user may also send an emergency cluster of multiple emergency incidents for group dispatch 1174. In some embodiments, the emergency incidents may be linked in the emergency response application and a new incident in computer aided dispatch (CAD) program based on this response. In some embodiments, the emergency incidents may create multiple incidents in a CAD program, which are also linked for efficient response and documentation.

As shown, the ESP user may allocate specific response assets (e.g., ambulances, fire engines, patrol cars, drones, tow trucks, etc.) to specific emergency clusters for efficient response. In some embodiments, the emergency response asset may be deployed to respond to multiple emergency incidents in a sequential manner.

Figure 12:
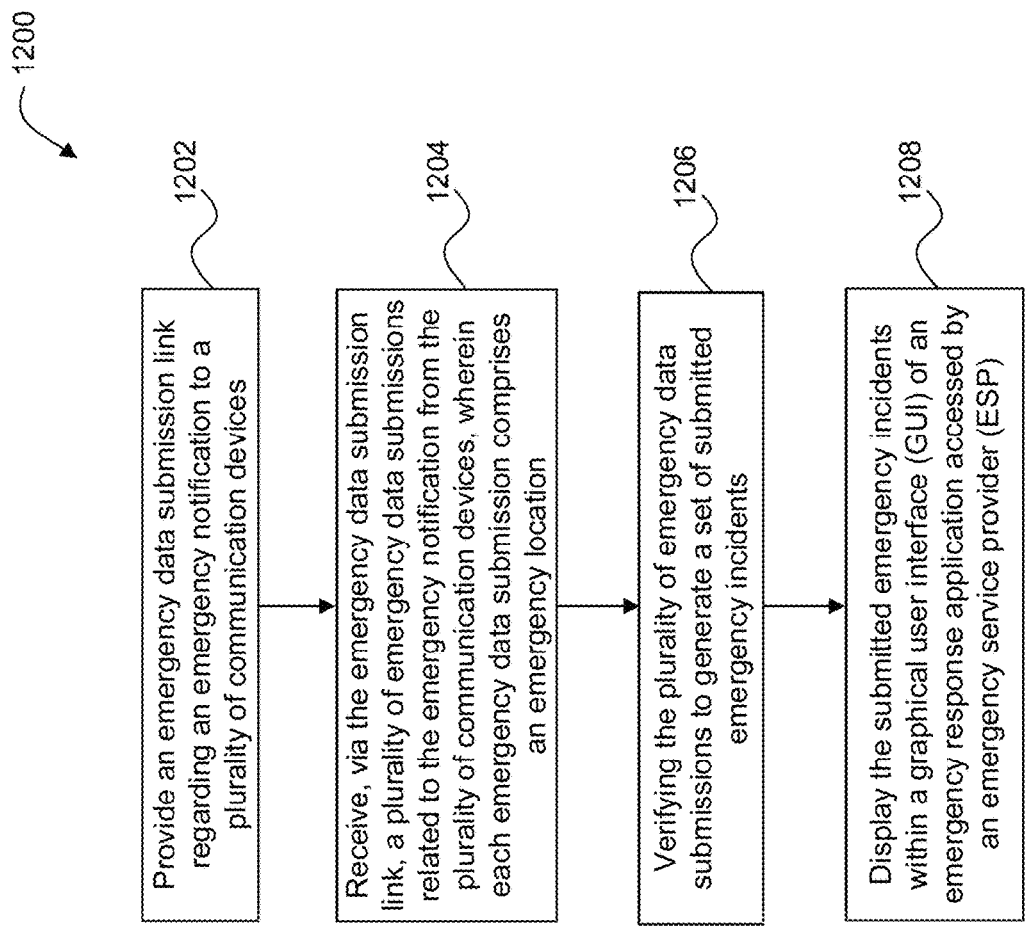
FIG. 12 illustrates an example method for sharing emergency data communications, according to some embodiments of the present disclosure.

FIG. 12 illustrates an example method 1200 for a system (e.g., ERDP 110) for sharing emergency data communications, according to some embodiments of this disclosure. Method 1200 may be described with regard to elements of FIGS. 1-11 and may be performed by ERDP 110 and/or computer system 1400 of FIG. 14. But method 1200 is not limited to the specific aspects depicted in those figures and other systems may be used to perform the method as will be understood by those skilled in the art. It is to be appreciated that not all operations may be needed, and the operations may not be performed in the same order as shown in FIG. 12.

At 1202, an emergency data submission link regarding an emergency is provided to a plurality of communication devices. In some embodiments, the emergency data submission link can be sent as part of a notification message that is broadcasted or multicast to a group of target devices. The target devices can be identified based on geography (e.g., a message is sent to people in a disaster zone). In some embodiments, target devices for sending the notification message can be identified based on the demographic group (e.g., a message is sent to phones of elderly people). In some embodiments, the target devices to send the notification messages can be identified based on certain characteristics of the citizens (e.g., occupation, age, gender, etc.). In some embodiments, a notification message with an emergency submission link can be sent to all devices in an area corresponding to an active amber alert.

At 1204, a plurality of emergency data submissions related to the emergency notification are received from the plurality of communication devices via the emergency data submission link, and each emergency data submission can include emergency location information. In some embodiments, an emergency data submission that is received in response to the emergency notification may include a completed survey providing additional information regarding the emergency condition (e.g., a response they are safe, a comment on smoke conditions, flooding, etc.). In some embodiments, the recipient may provide, via an emergency data submission, permission to share sensor feed with emergency personnel, such as camera feed or sending an image or voice recording. In some embodiments, an emergency data submission establishes a bidirectional communication between the user and the ESP. In some embodiments, an emergency data submission may include location information shared by the recipient. In some embodiments, an emergency data submission may involve a two-way chat or video streaming, or may include a transcript of the voice recording or summary of a video.

At 1206, the plurality of emergency data submissions are verified to generate a set of submitted emergency incidents. In some embodiments, verifying the plurality of emergency data submissions may involve verifying that the location corresponding to an emergency data submission of the plurality of emergency data submissions is within an estimated geographic area that is associated with an emergency. In some embodiments, verifying the plurality of emergency data submissions may involve verifying that a communication device of the plurality of communication devices is not on a list of blocked devices. In some embodiments, verifying the plurality of emergency data submissions may involve receiving, from each communication device of the plurality of communication devices, a confirmation of an emergency data submission.

At 1208, the submitted emergency incidents are displayed within the GUI of the emergency response application accessed by an emergency service provider (ESP). In some embodiments, step 1208 may further include identifying an affected area for the emergency notification based on the submitted emergency incidents, and displaying the affected area within the GUI of the emergency response application. In some embodiments, step 1208 may further include generating a heatmap of submitted emergency incidents using the plurality of emergency locations and displaying the heatmap of submitted emergency incidents within the GUI of the emergency response application accessed by the ESP. In some embodiments, the generated heatmap graphically represents a density of the plurality of emergency incidents. In some embodiments, the heatmap graphically represents an affected area of a mass emergency (e.g., an area of a large fire in a commercial location, an area of an earthquake, or a disaster zone) that may impact a large number of people.

Figure 13:
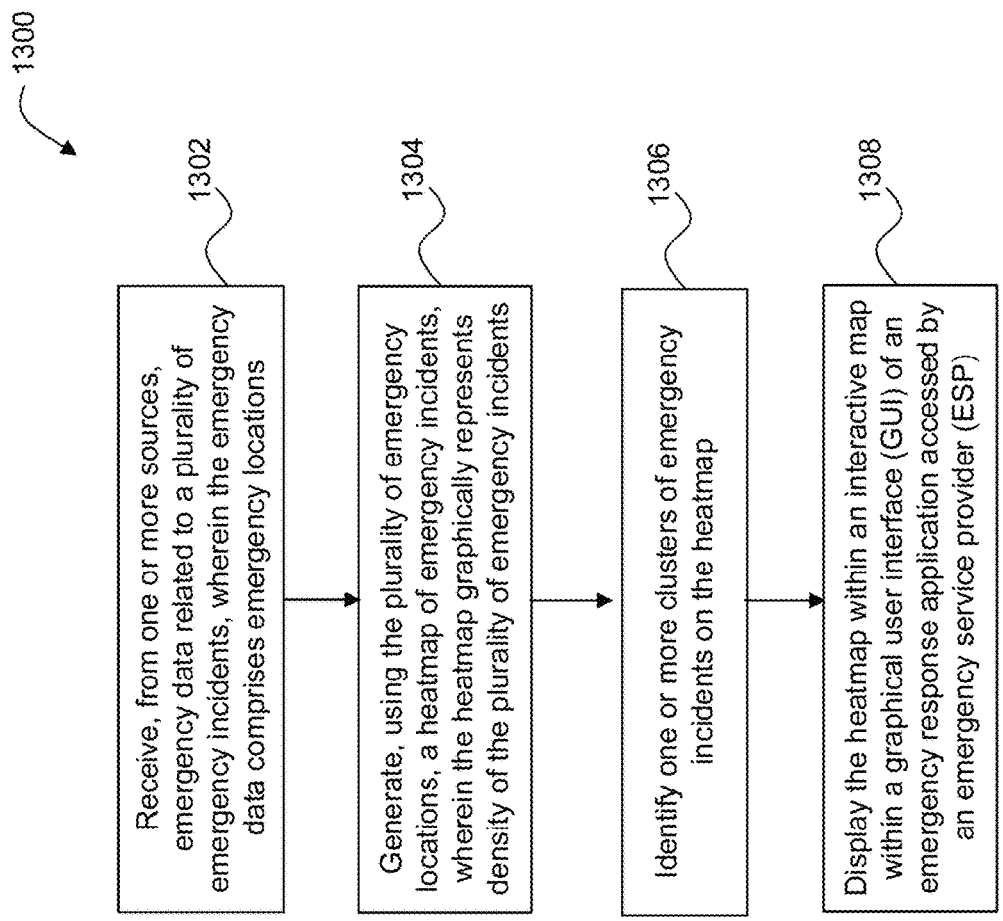
FIG. 13 illustrates an example method for collective emergency response, according to some embodiments of the present disclosure.

FIG. 13 illustrates an example method 1300 for a system (e.g., ERDP 110) for collective emergency response, according to some embodiments of this disclosure. Method 1300 may be described with regard to elements of FIGS. 1-11 and may be performed by ERDP 110 and/or computer system 1400 of FIG. 14. But method 1300 is not limited to the specific aspects depicted in those figures and other systems may be used to perform the method as will be understood by those skilled in the art. It is to be appreciated that not all operations may be needed, and the operations may not be performed in the same order as shown in FIG. 13.

At 1302, emergency data related to a plurality of emergency incidents is received from one or more sources. The received emergency data can include emergency locations. In some embodiments, the received emergency data can also include information corresponding to the type of emergency and an emergency priority indicator. In some embodiments, the one or more sources may include at least one of a sensor device, a wireless communications device, a telephone landline, a public service answering point (PSAP) of the ESP, a telephone service provider, a telephone device manufacturer, a social media post, and a public safety agency.

At 1304, a heatmap of emergency incidents is generated using the plurality of emergency locations included in the emergency data. In some embodiments, the generated heatmap graphically represents a density of the plurality of emergency incidents. In some embodiments, the heatmap graphically represents an affected area of a mass emergency that may impact a large number of people. In some embodiments, step 1304 can further include providing an emergency data submission link to a group of communication devices that are located within an estimated geographic area associated corresponding to the heatmap. A plurality of emergency data submissions related to the plurality of emergency incidents can subsequently be received via the emergency data submission link. An updated heatmap can be generated using the received emergency data submissions.

At 1306, one or more clusters of emergency incidents are identified on the heatmap. In some embodiments, one or more clusters of emergency incidents may be identified based on one or more of an emergency type, an emergency priority, a type of notification, and an emergency incident density. In some embodiments, a plurality of emergency incidents on the heatmap may automatically be grouped into an emergency cluster when a threshold number of emergency incidents occur (i.e., are associated with emergency locations) within a threshold distance of each other. In some embodiments, an ESP user accessing an Emergency Density View can determine the threshold values (e.g., the threshold number of emergency incidents, or the threshold distance between them) that are used to identify one or more emergency clusters on the heatmap. In some embodiments, step 1306 can further include receiving a selection of a cluster of emergency incidents within the heatmap within the interactive map. In response to receiving the selection of the cluster of emergency incidents, only emergency locations associated with emergency incidents within the heatmap are displayed within the interactive map.

At 1308, the heatmap is displayed within an interactive map within a graphical user interface (GUI) of an emergency response application that is accessible by an emergency service provider (ESP). In some embodiments, step 1308 can further include generating, based on the heatmap and/or based on the one or more clusters of emergency incidents, an estimate of a number of emergency response assets (e.g., ambulances, fire engines, patrol cars, drones, tow trucks, etc.) that are to be dispatched to the plurality of emergency locations.

Figure 14:
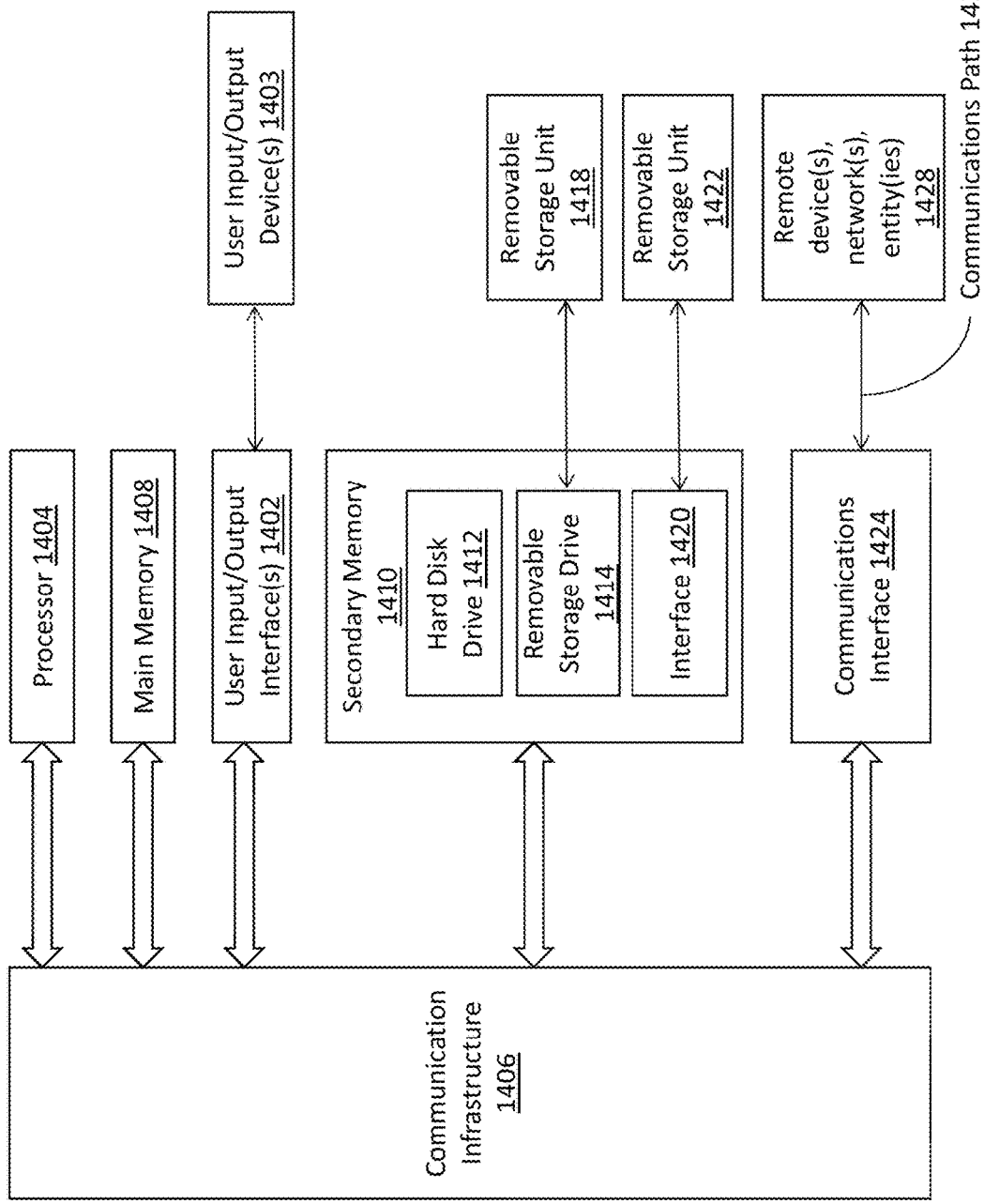
FIG. 14 is an example computer system useful for implementing various embodiments of the present disclosure.

Various embodiments may be implemented, for example, using one or more well-known computer systems, such as computer system 1400 shown in FIG. 14. One or more computer systems 1400 may be used, for example, to implement any of the embodiments discussed herein, as well as combinations and sub-combinations thereof.

Computer system 1400 may be any well-known computer capable of performing the functions described therein.

Computer system 1400 includes one or more processors (also called central processing units, or CPUs), such as a processor 1404. Processor 1404 is connected to a communication infrastructure or bus 1406.

One or more of processors 1404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1400 may also include a main or primary memory 1408, such as random access memory (RAM). Main memory 1408 may include one or more levels of cache. Main memory 1408 may have stored therein control logic (i.e., computer software) and/or data.

Computer system 1400 may also include one or more secondary storage devices or memory 1410. Secondary memory 1410 may include, for example, a hard disk drive 1412 and/or a removable storage device or drive 1414. Removable storage drive 1414 may be a floppy disk drive, a magnetic tape drive, a compact disk drive, an optical storage device, tape backup device, and/or any other storage device/drive.

Removable storage drive 1414 may interact with a removable storage unit 1418. Removable storage unit 1418 may include a computer usable or readable storage device having stored thereon computer software (control logic) and/or data. Removable storage unit 1418 may be a floppy disk, magnetic tape, compact disk, DVD, optical storage disk, and/any other computer data storage device. Removable storage drive 1414 may read from and/or write to removable storage unit 1418.

Secondary memory 1410 may include other means, devices, components, instrumentalities or other approaches for allowing computer programs and/or other instructions and/or data to be accessed by computer system 1400. Such means, devices, components, instrumentalities or other approaches may include, for example, a removable storage unit 1422 and an interface 1420. Examples of the removable storage unit 1422 and the interface 1420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1400 may further include a communication or network interface 1424. Communication interface 1424 may enable computer system 1400 to communicate and interact with any combination of external devices, external networks, external entities, etc. (individually and collectively referenced by reference number 1428). For example, communication interface 1424 may allow computer system 1400 to communicate with external or remote devices 1428 over communications path 1426, which may be wired and/or wireless (or a combination thereof), and which may include any combination of LANs, WANs, the Internet, etc. Control logic and/or data may be transmitted to and from computer system 1400 via communication path 1426.

Computer system 1400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1400, main memory 1408, secondary memory 1410, and removable storage units 1418 and 1422, as well as tangible articles of manufacture embodying any combination of the foregoing. Such control logic, when executed by one or more data processing devices (such as computer system 1400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 14. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for sharing emergency data communications, comprising:
    providing an emergency data submission link regarding an emergency notification to a plurality of communication devices;
    receiving, via the emergency data submission link, a plurality of emergency data submissions related to the emergency notification from the plurality of communication devices, wherein each emergency data submission comprises an emergency location;
    verifying the plurality of emergency data submissions to generate a set of submitted emergency incidents;

determining geographic densities of the set of submitted emergency incidents; and displaying the geographic densities of the set of submitted emergency incidents as a heatmap within a graphical user interface (GUI) of an emergency response application accessed by an emergency service provider (ESP).

2. The computer implemented method of claim 1, further comprising:

determining, based on the set of submitted emergency incidents, an affected area for the emergency notification; and displaying the affected area within the GUI of the emergency response application accessed by the ESP.

3. The computer implemented method of claim 1, wherein the providing the emergency data submission link further comprises:

obtaining, from one or more sources, an alert corresponding to an emergency;

identifying device identifiers corresponding to each of the plurality of communication devices, wherein the plurality of communication devices are located within an estimated geographic area associated with the emergency; and providing the emergency data submission link to the plurality of communication devices using the device identifiers.

4. The computer implemented method of claim 3, wherein the one or more sources comprises at least one of a wireless communications device, a telephone landline, a public service answering point (PSAP) of the ESP, a telephone service provider, a telephone device manufacturer, a social media post, and a public safety agency.

5. The computer implemented method of claim 1, wherein verifying the plurality of emergency data submissions further comprises receiving, from each communication device of the plurality of communication devices, a confirmation of the emergency data submission.

6. The computer implemented method of claim 1, wherein the emergency data submission link is sent to a communication device of the plurality of communication devices via one or more of short message service (SMS) text, SMS data, a multimedia messaging service (MMS), Internet protocol (IP) messaging, email, or an integrated public alert and warning system (IPAWS).

7. The computer implemented method of claim 1, wherein the emergency data submission link provides a user of a communication device of the plurality of communication devices with an option to perform at least one of the following actions:

completing a survey form;

uploading an image, audio, or video file;

granting permission to an Internet of things (IoT) sensor feed; or sharing a location, text chat, or video stream via a web real-time communication (WebRTC) link.

8. The computer implemented method of claim 1, wherein a device identifier corresponding to a communication device of the plurality of communication devices is obtained from one or more of a public service answering point (PSAP) of the ESP, a telephone service provider, a telephone device manufacturer, and a public safety agency.

9. The computer implemented method of claim 1, wherein the emergency data submission link is a hyperlink, a web real-time communication (WebRTC) link, a phone number, a web service endpoint, or an Internet protocol (IP) address.

10. A system for emergency response, comprising:
a memory; and
at least one processor coupled to the memory and configured to:

receive, from one or more sources, emergency data related to a plurality of emergency incidents, wherein the emergency data comprises emergency locations;

generate a heatmap of emergency incidents, by determining and graphically representing geographic densities of the plurality of emergency incidents;

identify one or more clusters of emergency incidents on the heatmap; and display the heatmap within an interactive map within a graphical user interface (GUI) of an emergency response application accessed by an emergency service provider (ESP).

11. The system of claim 10, wherein the one or more clusters of emergency incidents is identified based on one or more of an emergency type, an emergency priority, a type of notification, and an emergency incident density.

12. The system of claim 10, wherein the one or more sources comprises at least one of a sensor device, a wireless communications device, a telephone landline, a public service answering point (PSAP) of the ESP, a telephone service provider, a telephone device manufacturer, a social media post, and a public safety agency.

13. The system of claim 10, wherein the processor is further configured to:

generate, based on the heatmap, an estimate of a number of emergency response assets that are to be dispatched to the plurality of emergency incidents.

14. The system of claim 10, wherein the processor is further configured to:

provide an emergency data submission link to a plurality of communication devices, wherein the plurality of communication devices are located within an estimated geographic area corresponding to the heatmap;

receive, via the emergency data submission link, a plurality of emergency data submissions related to the plurality of emergency incidents; and generate an updated heatmap using the plurality of emergency data submissions.

15. The system of claim 10, wherein the emergency data further comprises at least one of an emergency type and an emergency priority indicator.

16. The system of claim 10, wherein the processor is further configured to:

receive a selection of a cluster of emergency incidents within the heatmap within the interactive map; and in response to receiving the selection of the cluster of emergency incidents, display, within the interactive map, only emergency locations associated with emergency incidents within the heatmap.

17. The system of claim 10, wherein the processor is further configured to:

receive a selection of an emergency incident from within a cluster of emergency incidents within the interactive map;

receive a request to remove the emergency incident from the cluster of emergency incidents through the GUI of the emergency response application; and remove the emergency incident from the cluster of emergency incidents.

18. A non-transitory computer-readable medium having instructions stored thereon that, when executed by at least one computing device, cause the at least one computing device to perform operations comprising:

providing an emergency data submission link regarding an emergency notification to a plurality of communication devices;

receiving, via the emergency data submission link, a plurality of emergency data submissions related to the emergency notification from the plurality of communication devices, wherein each emergency data submission comprises an emergency location;

verifying the plurality of emergency data submissions to generate a set of submitted emergency incidents;

determining geographic densities of the set of submitted emergency incidents; and displaying the geographic densities of the set of submitted emergency incidents as a heatmap within a graphical user interface (GUI) of an emergency response application accessed by an emergency service provider (ESP).

19. The non-transitory computer-readable medium of claim 18, the operations further comprising:

determining, based on the set of submitted emergency incidents, an affected area for the emergency notification; and displaying the affected area within the GUI of the emergency response application accessed by the ESP.

* * * * *